United States Patent
Yang et al.

(10) Patent No.: US 10,202,522 B2
(45) Date of Patent: Feb. 12, 2019

(54) SUPERAMPHIPHOBIC SURFACES AND COMPOSITIONS AND METHODS OF FORMING THE SAME

(71) Applicant: The Trustees of The University of Pennsylvania, Philadelphia, PA (US)

(72) Inventors: Shu Yang, Blue Bell, PA (US); Dengteng Ge, Philadelphia, PA (US); Lili Yang, Heilongjiang (CN)

(73) Assignee: Drexel University, Philadelphia, PA (US)

( * ) Notice: Subject to any disclaimer, the term of this patent is extended or adjusted under 35 U.S.C. 154(b) by 93 days.

(21) Appl. No.: 15/035,016

(22) PCT Filed: Nov. 7, 2014

(86) PCT No.: PCT/US2014/064591
§ 371 (c)(1),
(2) Date: May 6, 2016

(87) PCT Pub. No.: WO2015/070040
PCT Pub. Date: May 14, 2015

(65) Prior Publication Data
US 2016/0289498 A1    Oct. 6, 2016

Related U.S. Application Data

(60) Provisional application No. 61/901,866, filed on Nov. 8, 2013.

(51) Int. Cl.
| | |
|---|---|
| C09D 183/02 | (2006.01) |
| C09D 183/08 | (2006.01) |
| B05D 1/02 | (2006.01) |
| B05D 3/06 | (2006.01) |
| C08G 77/02 | (2006.01) |
| C08G 77/24 | (2006.01) |

(52) U.S. Cl.
CPC ............. *C09D 183/02* (2013.01); *B05D 1/02* (2013.01); *B05D 3/067* (2013.01); *C09D 183/08* (2013.01); *C08G 77/02* (2013.01); *C08G 77/24* (2013.01)

(58) Field of Classification Search
CPC . B05D 1/02; B05D 3/067; C08K 3/36; C09D 183/02; C09D 183/08
See application file for complete search history.

(56) References Cited

U.S. PATENT DOCUMENTS

| | | | |
|---|---|---|---|
| 2013/0034653 A1* | 2/2013 | Kumar | B05D 5/06 427/162 |
| 2013/0216820 A1* | 8/2013 | Riddle | C09D 4/00 428/313.9 |
| 2014/0238263 A1* | 8/2014 | Scheonfisch | B05D 1/02 106/2 |

FOREIGN PATENT DOCUMENTS

WO    WO 2012-167017 A2    12/2012

OTHER PUBLICATIONS

Ahuja et al., "Nanonails: A Simple Geometrical Approach to Electrically Tunable Superlyophobic Surfaces", Langmuir, 2008, 24(1), 9-14.
Barthlott et al., "Purity of the sacred lotus, or escape from contamination in biological surfaces", Planta, Apr. 1997, 202(1), 1-8.
Bhushan et al., "Self-Cleaning Efficiency of Artificial Superhydrophobic Surfaces", Langmuir, Feb. 2009, 25(5), 3240-3248.
Butt et al., "Design principles for superamphiphobic surfaces", Soft Matter, 2013, 9, 418-428.
Campos et al., "Superoleophobic Surfaces through Control of Sprayed-on Stochastic Topography", Langmuir, 2012, 28(25), 9834-9841.
Cao et al., "Super Water- and Oil-Repellent Surfaces on Intrinsically Hydrophilic and Oleophilic Porous Silicon Films", Langmuir, 2008, 24(5), 1640-1643.
Cao et al., "Transparent Superhydrophobic and highly Oleophobic coatings", Faraday Discussions, 2010, 146, 57-65.
Cassie et al., "Wettability of Porous Surfaces", Trans. Faraday Soc., 1944, 40, 546-551.
Deng et al., "Transparent, Thermally Stable and Mechanically Robust Superhydrophobic Surfaces Made from Porous Silica Capsules", Advanced Materials, 2011, 23, 2962-2965.
Deng et al., "Candle Soot as a Template for a Transparent Robust Superamphiphobic Coating", Science, 2012, 335(6064), 67-70.
Du et al., "Effect of nanotube alignment on percolation conductivity in carbon nanotube/polymer composites", Physical Review B, Sep. 2005, 72(12), 121404.
Dufour et al., "Contact Angle Hysteresis Origins: Investigation on Super-Omniphobic Surfaces", Soft Matter, 2011, 7, 9380-9387.
Erbil et al., "Transformation of a Simple Plastic into a Superhydrophobic Surface", Science, Feb. 2003, 299(5611), 1377-1380.
Feng et al., "Creation of a Superhydrophobic Surface from an Amphiphilic Polymer", Angew. Chem. Int. Ed, 2003, 42, 800-802.
Fleury et al., "Transparent Coatings Made from Spray Deposited Colloidal Suspensions", Langmuir, 2012, 28(20), 7639-7645.
Ganesh et al., "Electrospun $SiO_2$ Nanofibers as a Template to Fabricate a Robust and Transparent Superamphiphobic Coating", RSC Advances, 2013, 3(12), 3819-3824.
Gao et al., "Biophysics: Water-repellant legs of water striders", Nature, Nov. 2004, 432, 36.
Guvendiren et al., "Precipitated Calcium Carbonate Hybrid Hydrogens: Structural and Mechanical Properties", Macromolecules, Jul. 2009, 42(17), 6606-6613.
Guvendiren et al., "Calcium Carbonate Composite Hydrogel Films: Particle Packing and Optical Properties", Polymer Engineering & Science, Jun. 2012, 52(6), 1317-1324.

(Continued)

*Primary Examiner* — Edward J Cain
(74) *Attorney, Agent, or Firm* — Baker & Hostetler LLP

(57) ABSTRACT

Provided herein are fluid compositions comprising at least one silane having one or more hydrophilic groups, at least one silane having one or more fluorinated moieties, and stringed silica nanoparticles. Additionally, superamphiphobic surfaces resulting from coating and curing a fluid composition on a substrate are disclosed. Also provided are methods of forming a superamphiphobic surface, comprising coating a substrate of interest with the fluid composition and curing the coated substrate.

22 Claims, 16 Drawing Sheets

(56) References Cited

OTHER PUBLICATIONS

Han et al., "Brownian Motion of an Ellipsoid", Science, Oct. 2006, 314(5799), 626-630.
He et al., "Fabrication of a Transparent Superamphiphobic Coating with Improved Stability", Soft Matter, 2011, 7(14), 6435-6443.
Karunakaran et al., "Highly Transparent Superhydrophobic Surfaces from the Coassembly of Nanoparticles", Langmuir, 2011, 27(8), 4594-4602.
Kim et al. "A simple fabrication route to a highly transparent super-hydrophobic surface with a poly(dimethylsiloxane) coated flexible mold", Chemical Communications, 2007, 22, 2237-2239.
Labacz-Kgcik et al. "Fractal analysis of thermally sprayed coatings", Proc. Appl. Math. Mech., Dec. 2009, 9(1), 543-544.
Levkin et al., "Porous Polymer Coatings: A Versatile Approach to Superhydrophobic Surfaces", Advanced Functional Materials, Jun. 2009, 19(12) 1993-1998.
Li et al., "A facile layer-by-layer deposition process for the fabrication of highly transparent superhydrophobic coatings", Chemical Communications, 2009, 19, 2730-2732.
Mihut et al., "Enhance properties of Polyurea elastomeric nanocomposites with anisotropic functionalised nanofillers", Polymer, Jul. 2013, 54(16), 4194-4203.
Ogihara et al., "Simple Method for Preparing Superhydrophobic Paper: Spray-Deposited Hydrophobic Silica Nanoparticle Coatings Exhibit High Water-Repellency and Transparency", Langmuir, 2012, 28(10), 4605-4608.
Onda et al., "Super-water-repellant Fractal Surfaces", Langmuir 1996, 12(9), 2125-2127.
Parker et al., "Water capture by a desert beetle", Nature, Nov. 2001, 414, 33-34.
Rahmawan et al., "Self-assembly of nanostructures towards transparent, superhydrophobic surfaces", Journal of Materials Chemistry A, 2013, 1(9), 2955-2969.
Sheen et al., "Non-fluorinated superamphiphobic surfaces through sol-gel processing of methyltriethoxysilane and tetraethoxysilane", Materials Chemistry and Physics, Mar. 2009, 114(1), 63-68.
Tuteja et al., "Designing Superoleophobic Surfaces", Science, Dec. 2007, 318(5856), 1618-1622.
Wang et al., "One-step coating of fluoro-containing silica nanoparticles for universal generation of surface superhydrophobicity", Chemical Communications, 2008, 7, 877-879.
Wenzel et al., "Resistance of Solid Surfaces to Wetting by Water", Industrial and Engineering Chemistry, 1936, 28(8), 988-994.
White et al., "Simulations and electrical conductivity of percolated networks of finite rods with various degrees of axial alignment", Physical Review B, Jan. 2009, 79(2) 024301.
White et al., "Electrical Percolation Behavior in Silver Nanowire-Polystyrene Composites: Simulation and Experiment", Advanced Functional Materials, Aug. 2012, 20(16), 2709-2716.
Wong et al., "Bioinspired self-repairing slippery surfaces with pressure-stable ominiphobiticy", Nature, Sep. 2011, 477(7365) 443-447.
Xi et al., "A general approach for fabrication of superhydrophobic and superamphiphobic surfaces", Applied Physics Letters, Feb. 2008, 92(5), 1063.
Xie et al., "Facile creation of a super-amphiphobic coating surface with bionic microstructure", Advanced Materials, Feb. 2004, 16(4), 302-305.
Xu et al., "Superhydrophobic Surfaces from One-Step Spin Coating of Hydrophobic Nanoparticles", ACS Applied Materials & Interfaces, 2012, 4(2), 1118-1125.
Yunker et al., "Suppression of the coffee-ring effect by shape-dependent capillary interactions", Nature, Aug. 2011, 476(7360), 308-311.
Zenerino et al. "Connector Ability to Design Superhydrophobic and Oleophobic Surfaces from Conducting Polymers", Langmuir, Jul. 2010, 26(16), 13545-13549.
Zheng et al., "Directional adhesion of superhydrophobic butterfly wings", Soft Matter, 2007, 3, 178-182.
Zhou et al., "Fluoroalkyl Silane Modified Silicone Rubber/Nanoparticle Composite: A Super Durable, Robust Superhydrophobic Fabric Coating", Advanced Materials, May 2012, 24(18), 2409-2412.
Zhou et al., "Robust, Self-Healing Superamphiphobic Fabrics Prepared by Two-Step Coating of Fluoro-Containing Polymer, Fluoroalkyl Silane, and Modified Silica Nanoparticles", Apr. 2013, 23(13) 1664-1670.

\* cited by examiner

SUPERAMPHIPHOBIC SURFACES AND COMPOSITIONS AND METHODS OF FORMING THE SAME

CROSS REFERENCE TO RELATED APPLICATIONS

This application is a National Stage Application filed under 35 U.S.C. 371 of International Application No. PCT/US2014/064591, filed Nov. 7, 2014, which claims priority to U.S. Provisional Application No. 61/901,866, filed Nov. 8, 2013, the disclosure of each of which are hereby incorporated by reference in their entirety.

TECHNICAL FIELD

This disclosure relates to superamphiphobic surfaces and compositions and methods for forming the same.

BACKGROUND

In nature, lotus leaves, water strider's legs, butterfly wings and desert beetle scales show remarkable water-repellency. Fascinated by such surfaces, there has been extensive effort to mimic the hierarchical surface morphologies exhibited in natural systems. Most of these surfaces, however, do not repel oil which has much lower surface energy than water. Most of the methods reported to fabricate superamphiphobic surfaces require multiple steps before and after applying the coatings, making the systems unsuitable for large-area, low-cost applications.

Thus, there is a need in the art for single step methods to create superamphiphobic surfaces and compositions for forming the same.

SUMMARY OF THE INVENTION

Disclosed herein are fluid compositions comprising at least one silane having one or more hydrophilic groups, at least one silane having one or more fluorinated moieties, and stringed silica nanoparticles. The composition can comprise a dispersion of stringed amphiphilic silica nanoparticles in a sol solution of a partial condensation product of the at least one silane having one or more hydrophilic groups and the at least one silane having one or more fluorinated moieties.

Superamphiphobic surfaces resulting from coating and curing a fluid composition on a substrate are provided herein.

Also disclosed herein are methods of forming a superamphiphobic surface, comprising coating a substrate with the disclosed fluid compositions and curing the coated substrate.

BRIEF DESCRIPTION OF THE DRAWINGS

The summary, as well as the following detailed description, is further understood when read in conjunction with the appended drawings. For the purpose of illustrating the disclosed compositions, superamphiphobic surfaces, and methods, there are shown in the drawings exemplary embodiments of the compositions, superamphiphobic surfaces, and methods; however, the compositions, superamphiphobic surfaces, and methods are not limited to the specific embodiments disclosed. In the drawings:

FIGS. 1A-1D, illustrates (A) exemplary schematic illustrations of the synthesis of transparent superamphiphobic coating by spray coating of stringed silica nanoparticles. (B-C): Top-view SEM images of (B) as-received stringed silica nanoparticles and (C) after surface modification with TEOS/HDFTES=2:1 v/v. Both pictures were taken on carbon coated copper grids without Au coating. (D) SEM images of the superamphiphobic coating with network of stringed silica NPs, which was taken after the sputtering of Au. Inset: High-resolution SEM image showing the fractal, nanoporous structure.

FIGS. 2A and 2B, represent (A) an SEM image of an examplary superamphiphobic coating, showing fractal structure with dual scale roughness without any micropore. Inset: Cross-sectional SEM of the coating sprayed from 0.25 mL solution from stringed silica NPs and TEOS, HDFTES (2:1 v/v) over an area of 1 inch×1 inch; and (B) SEM images of stringed silica particles after modification by TEOS and HDFTES and coated with Au by sputtering for 30 s. The NP surface became rougher and the particle size was increased compared to those without Au coating.

FIGS. 4A-4F, show the top-view and cross-sectional view SEM images of exemplary coatings sprayed from different volumes of NP/sol solution on the glass slides. (A-B) 0.05 mL/inch$^2$. (C-D) 0.1 mL/inch$^2$. (E-F) 0.125 mL/inch$^2$.

FIGS. 5A-5B, represent (A) Photograph of four droplets, including dyed water ((1) red—top left), dyed propylene carbonate ((2) blue—top right), olive oil ((3) yellow—bottom left) and hexadecane ((4) colorless—bottom right), deposited on an exemplary superamphiphobic glass slide (0.25 mL solution sprayed on 1 inch×1 inch glass slides). (B) UV-Vis transmittance of the coatings sprayed from different amount of solutions on glass slides (A: 0.1 mL/inch$^2$; B: 0.125 mL/inch$^2$; C: 0.25 mL/inch$^2$; and D: 0.5 mL/inch$^2$). The bare glass was used as reference.

FIGS. 6A-6B, represent (A) SEM image of the sprayed coated ES-1 sample. (B) Photo of a hexadecane droplet deposited on the coated glass slide.

FIGS. 7A-7B, represent (A) SEM image of the sprayed ES-2 sample. (B) Photo of a hexadecane droplet on the coating.

FIGS. 8A-8C, represent (A) SEM images of the stringed silica nanoparticle/sol solutions spray-coated on glass slides, which were prepared from different silane compositions. (I) TEOS: 0 mL and HDFTES: 0 mL; (II) TEOS: 0 mL and HDFTES: 0.15 mL; (III) TEOS: 0.3 mL and HDFTES: 0.15 mL. Scale bar: 200 nm. (B) Illustrations of stringed silica particle with different chemical natures during the evaporation of solvents. (I) close assembly of stringed silica particles modified by —OH; (II) non-close assembly of stringed silica particles modified by —CF3; (III) self-arrangement of amphiphilic stringed silica particles through tilting. (C) Schematic illustrations of different assemblies of rigid cylindrical rods. (I) close-packed structure of parallel rods within layer; (II) non-close-packed assembly of parallel rods inside the layer; (III) 3D random assembly of rods tilted by random angles.

FIGS. 9A-9C, represent AFM images of the stringed silica NP/sol solutions spray-coated on the glass slides with different roughness. The solutions were prepared from different silane compositions and sprayed on glass slides (0.25 mL/inch$^2$). (A) TEOS: 0 mL and HDFTES: 0 mL, average roughness (Ra) of 5.44 nm and root-mean-square roughness (rms) of 7.07 nm; (B) TEOS: 0 mL and HDFTES: 0.15 mL, Ra of 38.7 nm and rms of 49.6 nm; (C) TEOS: 0.3 mL and HDFTES: 0.15 mL, $R_a$ of 47.6 nm and rms of 59.6 nm.

FIGS. 12A-12D represent schematic illustrations of (A) water jetting setup and (B) sand abrasion setup. Optical images of (C) water jetting and (D) sand abrasion experiments.

FIGS. 13A-13D represent (A) Effect of water jetting pressure on repellency of water (red), olive oil (black), and hexadecane (blue). (B) SEM images of the coating after water jetting at 50 kPa for 10 min. Inset: higher magnification showing the loss of fractal structures. (C) Photo of the coated glass slide showing self-cleaning property after sand abrasion (20 g). The sands covered on the glass slide were removed when dropping the hexadecane on the lower right part of the glass, showing clearer substrate. (D) SEM image of the coating after sand abrasion (20 g). Inset: higher magnification showing micron-sized holes. The coating for water jetting was 5 μm-thick and the coating for sand abrasion was 8 μm-thick.

FIGS. 15A-15E represent optical images of hexadecane droplets on various substrates coated with exemplary superamphiphobic coatings. (A) Polyethylene terephthalate (PET). (B) Polycarbonate (PC). (C) Aluminum foil. (D) Colored cotton fabric. (E) UV-Vis spectra of three plastic substrates before ((1) black line) and after ((2) red line) the spray coating: (I) PET; (II) polystyrene (PS), and (III) PC.

DETAILED DESCRIPTION OF THE INVENTION

Figure 1:
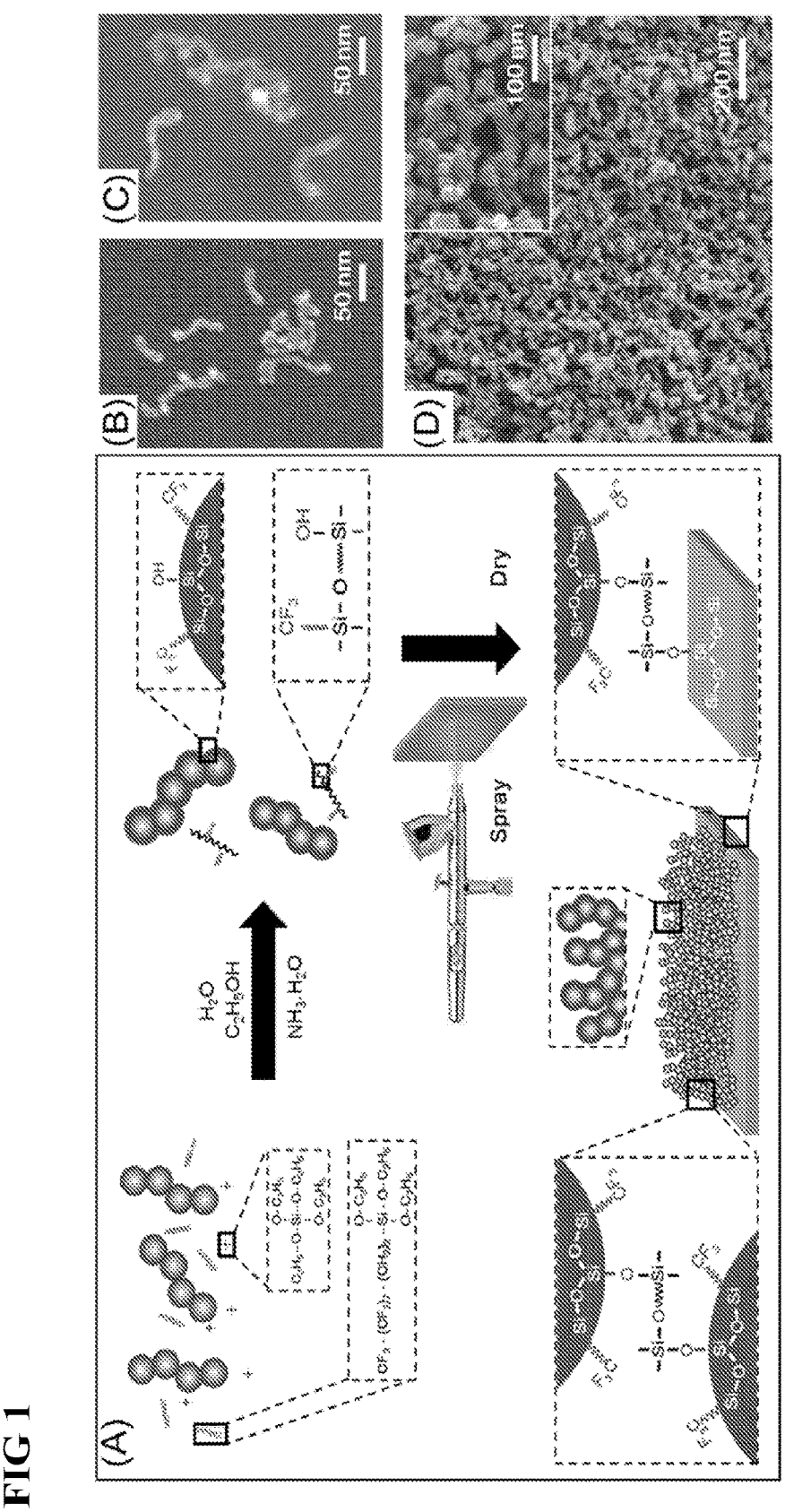
FIG. 1, comprising

The disclosed compositions, superamphiphobic surfaces, and methods may be understood more readily by reference to the following detailed description taken in connection with the accompanying figures, which form a part of this disclosure. It is to be understood that the disclosed compositions, superamphiphobic surfaces, and methods are not limited to the specific compositions, superamphiphobic surfaces, and methods described and/or shown herein, and that the terminology used herein is for the purpose of describing particular embodiments by way of example only and is not intended to be limiting of the claimed compositions, superamphiphobic surfaces, and methods.

Unless specifically stated otherwise, any description as to a possible mechanism or mode of action or reason for improvement is meant to be illustrative only, and the disclosed compositions, superamphiphobic surfaces, and methods are not to be constrained by the correctness or incorrectness of any such suggested mechanism or mode of action or reason for improvement.

Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Reference to a particular numerical value includes at least that particular value, unless the context clearly dictates otherwise. When a range of values is expressed, another embodiment includes from the one particular value and/or to the other particular value. Further, reference to values stated in ranges include each and every value within that range. All ranges are inclusive and combinable.

When values are expressed as approximations, by use of the antecedent "about," it will be understood that the particular value forms another embodiment.

It is to be appreciated that certain features of the disclosed compositions, superamphiphobic surfaces, and methods which are, for clarity, described herein in the context of separate embodiments, may also be provided in combination in a single embodiment. Conversely, various features of the disclosed compositions, superamphiphobic surfaces, and methods that are, for brevity, described in the context of a single embodiment, may also be provided separately or in any subcombination.

As used herein, the singular forms "a," "an," and "the" include the plural.

Disclosed herein are fluid compositions comprising: at least one silane having one or more hydrophilic groups; at least one silane having one or more fluorinated moieties; and stringed silica nanoparticles.

Hydrophilic groups include, but are not limited to alkoxy groups, epoxy groups, and amino groups. In a preferred aspect, the hydrophilic groups are alkoxy groups. In another aspect, the hydrophilic groups are epoxy groups. In another aspect, the hydrophilic groups are amino groups.

The stringed silica nanoparticles can be dispersed in a sol solution of a partial condensation product of the at least one silane having one or more hydrophilic groups and the at least one silane having one or more fluorinated moieties.

As used herein, the term "sol solution of a partial condensation product" refers to the product of a controlled hydrolysis reaction between at least one silane by the addition of water and an optional catalyst. The term "sol solution" reflects the fact that the degree of reactivity between the individual molecules of the at least one silane and the water may provide a reaction product having the character ranging from a pure solution and a gel. Preferred conditions are analogous to those described herein. In some embodiments, the sol solution can be prepared by mixing at least one silane having one or more alkoxy groups and at least one silane having one or more perfluorinated moieties with a sub-stoichiometric amount of water.

One skilled in the art would know that silanes are inorganic compounds having the chemical formula $SiR_4$, wherein the $R_1$, $R_2$, $R_3$, and $R_4$ are chloro, alkyl, alkoxy, epoxy, or amino groups that can be the same or different.

As used herein, "alkoxy groups" refer to an alkyl group bound through a single, terminal ether linkage; that is, an "alkoxy" group may be represented as —O-alkyl where alkyl refers to a linear, branched, or cyclic saturated hydrocarbon group typically, although not necessarily, containing 1 to about 24 carbon atoms, preferably 1 to about 12 carbon atoms, such as methyl, ethyl, n-propyl, isopropyl, n-butyl, isobutyl, t-butyl, octyl, decyl and the like.

In some aspects, the alkoxy groups can be lower alkoxy groups. As used herein, "lower alkoxy groups" refer to alkoxy groups having six or fewer carbons. In some aspects, the lower alkoxy group comprises methoxy. In some aspects, the lower alkoxy group comprises ethoxy. In some aspects, the lower alkoxy group comprises propoxy, for example n-propoxy and isopropoxy. In some aspects, the lower alkoxy group comprises butoxy, for example n-butoxy, isobutoxy, sec-butoxy, and tert-butoxy. Suitable lower alkoxy groups include those that are hydrophilic and capable of forming covalent bonds between hydrophilic silica nanoparticles, a substrate, or both the nanoparticles and a substrate.

Suitable silanes having lower alkoxy groups include, but are not limited to, tetraethyl orthosilicate (TEOS), tetramethoxysilane, methyltriethoxysilane, and methyltrimethoxysilane.

As used herein, "fluorinated moieties" include both partially fluorinated and perfluorinated moieties. In a preferred aspect, the fluorinated moieties are perfluorinated moieties.

As used herein, "perfluorinated moieties" refer to fully fluorinated $C_4$-$C_{16}$ hydrocarbon moieties, which are bonded to a silane silicon atom either directly or by a short chain (e.g., $C_1$-$C_6$ alkylene, preferably $C_2$ alkylene) linker. Thus, in some embodiments, the fluorinated moiety can be a fluorinated $C_4$-$C_{16}$ moiety.

Suitable silanes having perfluorinated moieties include, but are not limited to, (heptadecafluoro-1, 1, 2, 2 tetrahydrodecyl)triethoxysilane (HDFTES), (heptadecafluoro-1, 1, 2, 2 tetrahydrodecyl) trimethoxysilane or their triethoxysilane, (tridecafluoro-1,1,2,2-tetrahydrooctyl) dimethylchlorosilane, (trichloro(1H,1H,2H,2H-perfluorooctyl)silane (PFOS), and heptadecafluorodecyltrichlorosilane.

In some aspects of the invention, the composition comprises a single silane species having both lower alkoxy groups and perfluorinated moieties. In other aspects of the invention, the at least one silane having one or more lower alkoxy groups and at least one silane having one or more perfluorinated moieties are separate silanes.

Any combinations of the above alkoxy containing silanes and perfluorinated containing silanes can be used. For example, in some aspects, the at least one silane having lower alkoxy groups is tetraethyl orthosilicate (TEOS) and the at least one silane having perfluorinated moieties comprises (heptadecafluoro-1, 1, 2, 2 tetrahydrodecyl)triethoxysilane (HDFTES).

As used herein, "stringed silica nanoparticles" refer to a linear or branched array of contiguous nanoparticles, typically, but not necessarily, having a diameter of less than 20 nm, and an overall length of less than 100 nm, such as are shown in FIG. 1B. In some aspects, the diameter of the nanoparticles is 10-15 nm, and the overall length is 40-100 nm. Stringed silica nanoparticles include elongated NPs from Nissan Chemicals. Although these NPs are sold as "elongated nanoparticles," the inventors have characterized the nanoparticles and found that they are not "elongated" but rather smaller particles connected together.

The composition can further comprises a solvent, a catalyst, or both. For example, the composition can comprise a lower alcohol, ammonia, water, or any combination thereof. Lower alcohols include those alcohols having four or fewer carbons and include, but are not limited to, methanol, ethanol, propanol, isopropanol, butanol, n-butanol, isobutanol, sec-butanol, and tert-butanol.

The composition can have a solid concentration within the range of about 0.02 wt % to about 10 wt %. In some embodiments, the solid concentration can be within the range of about 0.02 wt % to about 10 wt %, within the range of about 0.1 wt % to about 5 wt %, and within the range of about 0.5 wt % to about 1 wt %. In some aspects, the solid concentration can be about 0.05 wt %. The solid concentration can be, for example, the silica nanoparticle concentration. Thus, the composition can have a silica nanoparticle concentration within the range of about 0.02 wt % to about 10 wt %. In some embodiments, the silica nanoparticle concentration can be within the range of about 0.02 wt % to about 10 wt %, within the range of about 0.1 wt % to about 5 wt %, and within the range of about 0.5 wt % to about 1 wt %. In some aspects, the silica nanoparticle concentration can be about 0.05 wt %.

Also disclosed herein are superamphiphobic surfaces comprising a substrate coated with a cured fluid composition. Suitable fluid compositions include those discussed supra. For example, in some aspects, the fluid compositions comprise at least one silane having one or more hydrophilic groups, at least one silane having one or more fluorinated moieties, and stringed silica nanoparticles. In some aspects, the stringed silica nanoparticles can be dispersed in a sol solution of a partial condensation product of the at least one silane having one or more hydrophilic groups and the at least one silane having one or more fluorinated moieties.

As used herein, "superamphiphobic surfaces" refer to surfaces that repel both water and oil. Accordingly, superamphiphobic surfaces are both superhydrophobic and superoleophobic. Superhydrophobic surfaces include surfaces having a water contact angle (WCA) of 150° or greater with very small contact angle hysteresis (CAH) (which refers to the difference between the advancing contact angle and receding contact angle, typically <10°). Water droplets typically start to roll off of such superhydrophobic surfaces at a very small tilt angle (typically <10°), while dislodging the hydrophilic contaminants on the surface. Superoleophobic refers to surfaces having extreme resistance to a number of liquids with low surface tension. These include surfaces having an oil contact angle greater than 150° and the oil droplet can roll off at a tile angle less than 10°.

In some aspects, the superamphiphobic surface can have a static water contact angle greater than 150°, a hexadecane contact angle greater than 150°, and a liquid roll-off angle of less than 5°.

Examples of substrates that can be coated with the composition include, but are not limited to, glass, ceramic, plastic, metal, fabric, paper, concrete, stone, brick, wood, or a combination thereof. Potential applications of the superamphiphobic surfaces include, but are not limited to, antifouling and self-cleaning fabrics, containers, windows and buildings, drag-force reduction of engines, droplet transfer in microfluidics, anti-frost/anti-icing, anti-fingerprint for touch panel screens, solar panels and optical devices, display panels, windows, optical equipment (e.g. lenses and goggles) and more.

The superamphiphobic surfaces generated by the fluid compositions can be present as a fractal-like nanoporous structure on the surface. While not wishing to be bound by theory, the fractal-like nanoporous structures can contribute to superamphiphobicity. Fractal is a complex pattern that is self-similar across different scales (i.e. microscale and nanoscale at different regions and different depth of the coating). The roughness generated by the fractal-like porous structure together with the perfluorinated moieties can make the coating repel both water and oil.

The superamphiphobic surfaces can be transparent to visible light. In some aspects, the superamphiphobic surfaces can have 100% transmittance in the visible wavelength. In some aspects, the superamphiphobic surfaces can have 95% transmittance in the visible wavelength. In some aspects, the superamphiphobic surfaces can have 90% transmittance in the visible wavelength. In some aspects, the superamphiphobic surfaces can have 80% transmittance in the visible wavelength.

The superamphiphobic surfaces disclosed herein can be resistant to mechanical wears. As used herein, "mechanical wears" refer to factors that can lead to the destruction of the superamphiphobic surfaces, including causing the surface to lose its coating. As used herein, "resistant" refers to the ability of the superamphiphobic surfaces to maintain their coating, and thus superamphiphobicity, upon exposure to mechanical wears. In some aspects, the surface is resistant to impact with liquids. In other aspects, the surface is resistant to impact with solids. In other aspects, the surface is resistant to applied forces. For example, in some embodiments the surface is resistant to repeated bending. In other embodiments, the surface is resistant to repeated contact. In some aspects, the surface is resistant to impact with solids, impact with liquids, and applied forces.

Also disclosed herein are methods of forming a superamphiphobic surface, comprising: coating a substrate of interest with a fluid composition and curing the coated substrate. Suitable fluid compositions include those discussed supra. For example, in some aspects, the fluid compositions comprise at least one silane having one or more hydrophilic groups, at least one silane having one or more fluorinated moieties, and stringed silica nanoparticles. In some aspects, the stringed silica nanoparticles can be dispersed in a sol solution of a partial condensation product of the at least one silane having one or more hydrophilic groups and the at least one silane having one or more fluorinated moieties.

As used herein, "curing" refers to the process of applying air, heat, or radiation so as to dehydrate, dealkoxylate, or both, so as to form polymerized siloxanes, which have the NPs incorporated within the polymerized siloxanes and are bonded to substrate, for example by covalent bonding. Numerous procedures familiar to those skilled in the art can be used to cure the surfaces of the present invention. Curing includes, but is not limited to, curing by air drying, heating, curing by ultraviolet light/ultraviolet radiation, or any combination thereof. In some embodiments, the superamphiphobic surfaces can be cured at room temperature. In other embodiments, the superamphiphobic surfaces can be cured by heating. For example, in some embodiments the curing comprises annealing the surfaces within the range of about 50° C. to about 100° C. Thus, in some aspects curing can be performed at 50° C. In some aspects curing can be performed at 60° C. In some aspects curing can be performed at 70° C. In some aspects curing can be performed at 80° C. In some aspects curing can be performed at 90° C. In some aspects curing can be performed at 100° C.

In some aspects, the coating comprises spray coating, spin coating, blade coating, or dip coating. In some embodiments, multiple applications of spray coating are preferred.

Suitable substrates include glass, ceramic, plastic, metal, fabric, paper, concrete, stone, brick, wood, or a combination thereof. In some aspects, the method can comprise coating glass with the disclosed fluid compositions and curing the coated glass. In some aspects, the method can comprise coating ceramic with the disclosed fluid compositions and curing the coated ceramic. In some aspects, the method can comprise coating plastic with the disclosed fluid compositions and curing the coated plastic. In some aspects, the method can comprise coating metal with the disclosed fluid compositions and curing the coated metal. In some aspects, the method can comprise coating fabric with the disclosed fluid compositions and curing the coated fabric. In some aspects, the method can comprise coating paper with the disclosed fluid compositions and curing the coated paper. In some aspects, the method can comprise coating concrete with the disclosed fluid compositions and curing the coated concrete. In some aspects, the method can comprise coating stone with the disclosed fluid compositions and curing the coated stone. In some aspects, the method can comprise coating brick with the disclosed fluid compositions and curing the coated brick. In some aspects, the method can comprise coating wood with the disclosed fluid compositions and curing the coated wood. In some aspects, the method can comprise coating a combination of the above substrates with the disclosed fluid compositions and curing the coated substrates.

EXAMPLES

Materials (Heptadecafluoro-1, 1, 2, 2-tetrahydrodecyl) triethoxysilane (HDFTES) was purchased from Gelest Inc. Tetraethyl orthosilicate (TEOS), ethanol, ammonia (28-30 vol %) aq. were all purchased from Sigma-Aldrich. Silica nanoparticles (NPs), IPA-ST-ZL (30 wt %) and IPA-ST-UP (15 wt %) dispersed in isopropanol (IPA) were obtained from Nissan Chemical America Corporation.

Formation of the Sol Solution Comprising Stringed Silica Nanoparticles

Since the as-received silica NPs were hydrophilic, hydrophobilization was necessary to achieve superamphiphobicity. Another important point is to introduce functional groups that could bind NPs and the substrate, and between the neighboring NPs. Two silanes, tetraethyl orthosilicate (TEOS) and (heptadecafluoro-1, 1, 2, 2-tetrahydrodecyl) triethoxysilane (HDFTES), were mixed at a volume ratio of 2:1, which acted as chemical binders and surface modifier, with strings of silica NPs in ammonia/ethanol solution to prepare the NP/sol solution for spray coating. Through hydrolysis and condensation, TEOS can be used to prepare silica sol-gel. Its ethoxy groups can also be utilized to covalent bond with NPs or substrates with hydroxyl groups.

In a typical procedure, to prepare the NP/sol solution for spray coating, ethanol (80 mL), ammonia (4 mL) and DI-water (8 mL) were mixed by stirring at 800 rpm at room temperature for 10 min. 1 g silica NP/IPA solution (IPA-ST-UP) was then slowly injected into the ethanol-ammonia solution, followed by stirring for 10 min. Then TEOS (0.3 mL) and HDFTES (0.15 mL) were slowly added to the mixture with stirring for 48 h at room temperature. After reaction, the whole mixture was ultrasonicated for 1 h (Branson Ultrasonic cleaner, 2210) and kept in a sealed container before spray coating. The overall solid concentration after the chemical modification was measured ~0.5 wt %. The final solution was almost transparent, colorless, and can remain stable for at least three months.

The mixed silanes could form an amphiphilic sol after hydrolysis and partial condensation, which would wet the surface of the silica NPs to provide bridges after curing, while fluorinated groups from HDFTES would provide necessary hydrophobicity and oleophobicity. There was also a good possibility that TEOS and HDFTES each would directly react with the hydroxyl groups on the silica NP surface, respectively. Therefore, the NP/sol mixture was not purified before spray coating.

Spray Coating of Superamphiphobic Films

Before spray coating, the solution was ultrasonicated (Branson Ultrasonic cleaner, 2210) for 15 min and then loaded into an airbrush with 0.2 mm nozzle size (G44, Master airbrush). Operating air was controlled by the airbrush compressor (TC-60, Master airbrush) at 20 psi, and the distance between the airbrush and the substrate was kept at 2-10 cm depending on the coated area. During the spray coating process, the airbrush was moved back and forth smoothly to make sure the complete and uniform coverage of the coating. The as-prepared silica NP/sol ethanol solution (0.25 mL, TEOS/HDFTES=2:1 v/v) was sprayed on a 1 inch×1 inch glass slide. Typically 0.25 mL solution was needed to completely cover an area of 1 inch×1 inch at a moving speed of 2-5 cm/s. Compared to other coating methods (e.g. dip coating and spin coating), spray coating offers benefits of rapid assembly over a very large area on both planar and curved surfaces. During spraying, because of the high pressure and a low concentration of NP/sol, the curing process was accelerated. After spray coating, the samples were dried in the air or annealed on a hot stage (50-100° C.) for 1-5 min to remove the residual solvent and cure the NP films. The contact angle results were not affected by the annealing temperature and duration. Therefore, the disclosed system offered a significant advantage in the viewpoint of simplicity.

Figure 2:
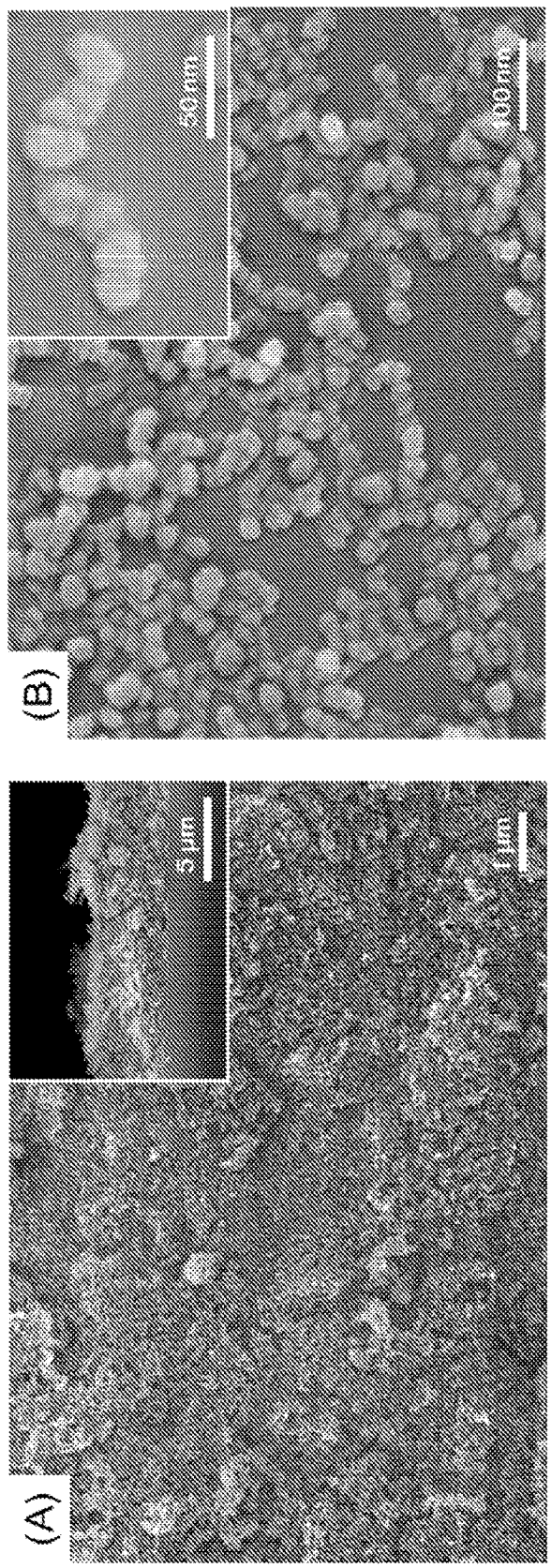
FIG. 2, comprising

As seen in FIG. 1D, a 3D fractal-like structure with loose nanopores was revealed from the sprayed coating. To equally compare the characteristics of the coatings, coatings with ~5 μm thick were used throughout this disclosure (FIG. 2).

FIG. 1A shows a schematic representation of the synthesis of exemplary transparent superamphiphobic coating by spray coating of stringed silica nanoparticles. As-received silica NPs (IPA-ST-UP, referred by Nissan Chemical) appeared as strings of small NPs (diameter of 10-15 nm) chained together with an overall length of 40-100 nm (FIG. 1B). The shape of colloidal particles has profound impact to their assembly and the resulting properties. For instance, rod particles, nanowires, and carbon nanotubes offer much lower percolation threshold compared to isotropic ones, thus, leading to higher mechanical strength or thermal/electrical conductivity. After surface modification with TEOS/HDFTES (2:1 v/v), the stringed silica NPs grew slightly larger to 15-20 nm in diameter with an overall length of 40-120 nm (FIG. 1C). After curing at room temperature, a 3D network of stringed NPs was formed. Meanwhile, the coated surface became intrinsically hydrophobic due to the disappearance of the silanol groups and the presence of —$CF_3$ groups in the NP coating.

Characterization of Coated Surfaces

Morphology of the coatings was investigated using a field-emission high-resolution scanning electron microscope (JEOL 7500F SEM) operated at 20.0 kV. The static contact angles (SCAs) were measured using the Ramé-Hart standard automated goniometer (Model 290) from 5-μL liquid droplets and the roll-off angles were measured using a home-made tilting stage from 10-μL liquid droplets. The surface topography of the coatings was imaged by Dimension 3000 Atomic Force Microscopy (AFM, Digital Instruments) with a $Si_3N_4$ cantilever in tapping mode. The average roughness ($R_a$) and root-mean-square (rms) roughness values were calculated from 5 μm×5 μm images using Gwyddion software. The transmittance of bare and coated substrates was collected from UV-vis-NIR spectrophotometer (Cary 5000, Varian). The chemical structures of the stringed silica NPs, its mixture in sol solution and the sprayed films on glass were measured from Fourier transform infrared (FTIR) spectrometer (Nicolet 8700, Thermo Scientific).

For thermal stability tests, the samples were put into the oven at a set temperature for 2 h, followed by cooling down naturally. The contact angles and roll-off angles were then measured.

Figure 3:
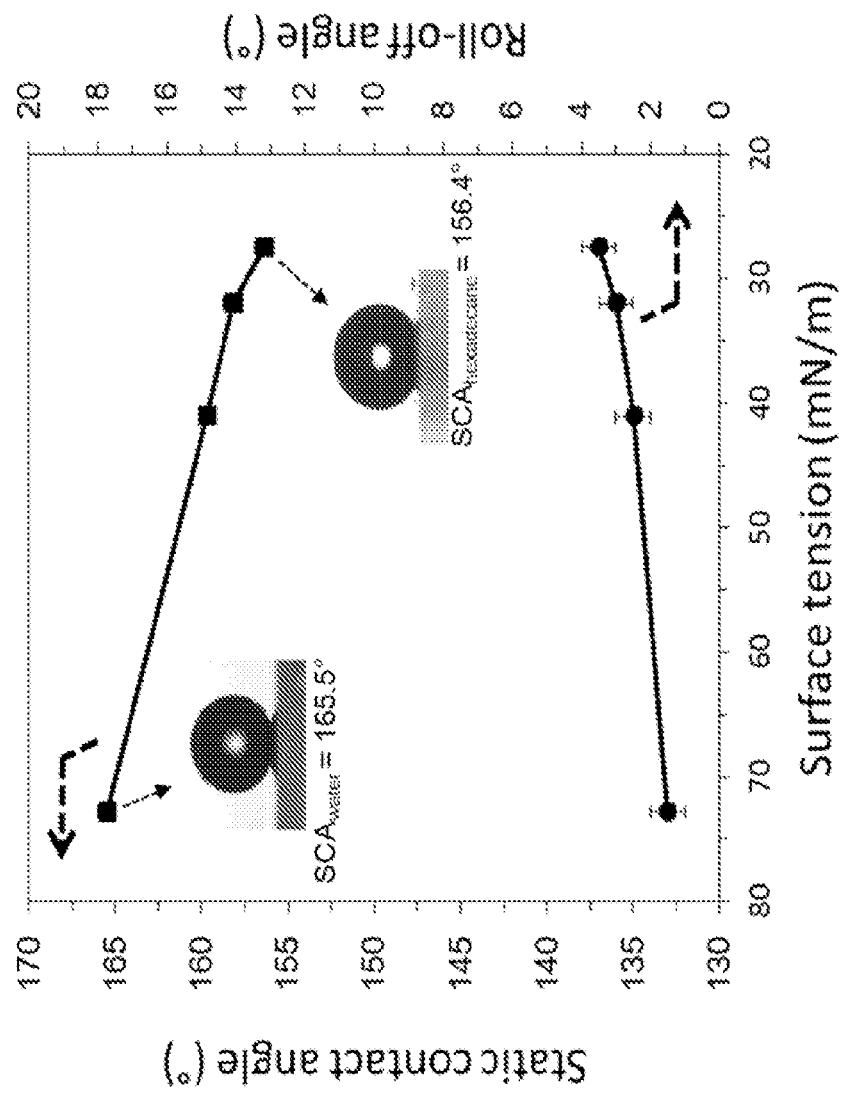
FIG. 3 represents the static contact angles (SCAs) and roll-off angles of water (72.8 mN/m), propylene carbonate (41.1 mN/m), olive oil (32.0 mN/m), and hexadecane (27.5 mN/m) droplets deposited on exemplary spray-coated amphiphobic coatings. The solution was prepared from mixture of stringed silica NPs with TEOS/HDFTES (2:1 v/v) ethanol solution. Insets: Optical images of a 5-μL water droplet and hexadecane droplet on the coating surface.
Figure 4:
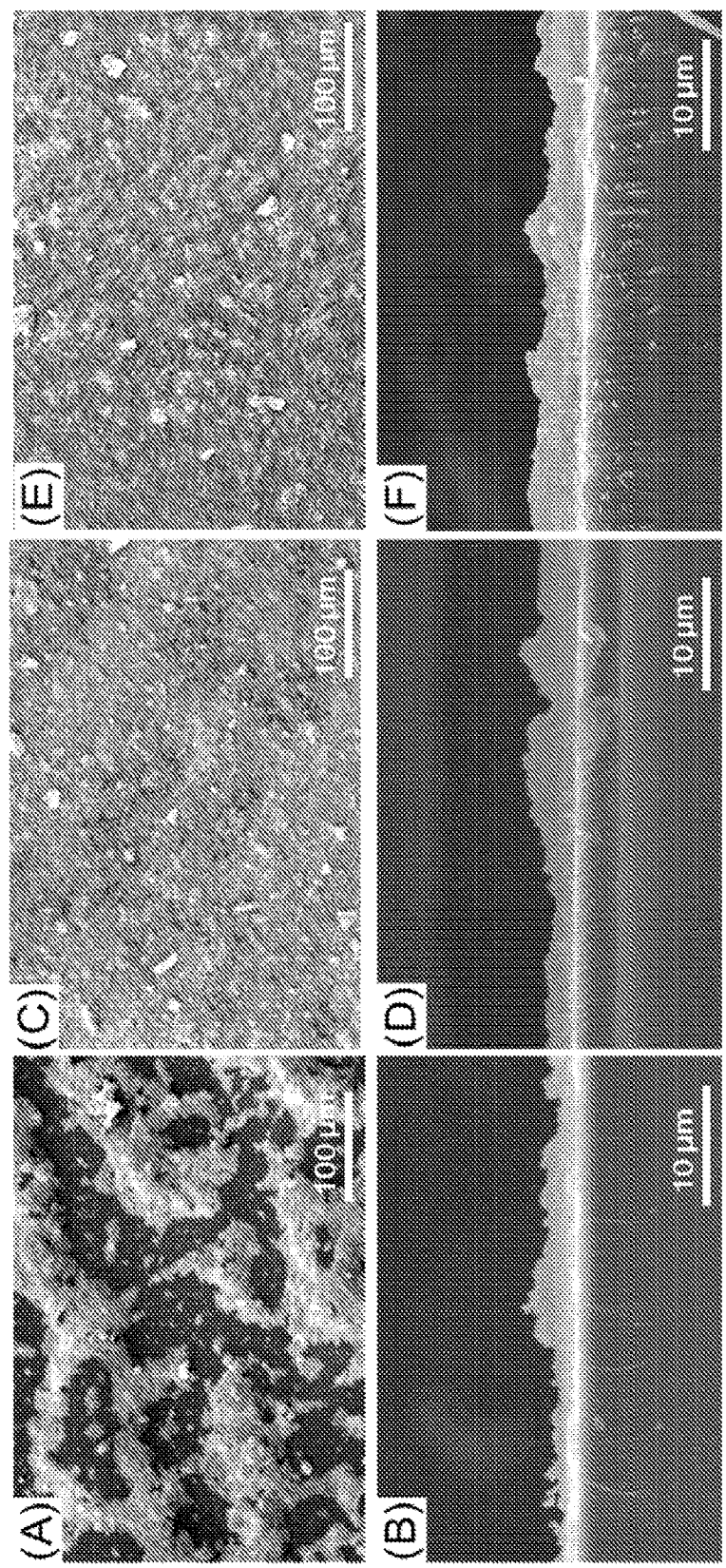
FIG. 4, comprising

Liquids of different surface tensions, including water (72.5 mN/m), propylene carbonate (41.1 mN/m), olive oil (32.0 mN/m), and hexadecane (27.5 mN/m), each with 5 μL volume were dropped on the coatings. The static contact angles (SCAs) and roll-off angles (RAs) at room temperature were measured and shown in FIG. 3. Water showed a SCA of 165.5° and RA less than 1.5°, suggesting superhydrophobicity. The SCA and RA were 156.4° and 3.5°, respectively, for hexadecane. To determine the optimal thickness of the coating for both water and oil-repellency, different amounts of NP sol solutions were sprayed onto the glass slides. As seen in FIG. 4 and Table 1, superhydrophobic but not superoleophobicity was achieved when 0.05 mL/inch² solution was sprayed. When increasing the spray solution volume to 0.1 mL/inch², the coating became superamphiphobic and the surface was completely covered with rather uniform nanoporous NP assembly. It is interesting to note that further increase of the spraying volume only increased coating thickness but did not significantly changed the SCAs or RAs. It may due to the similar structure of the outer layer of the coatings after whole substrate was covered by sequential coating.

TABLE 1

Water and hexadecane SCAs and RAs of coatings sprayed on the glass slides from different volumes of solutions.

| Solution Volume (mL/inch²) | Thickness (μm) | Water SCA (°) | Water RA (°) | Hexadecane SCA (°) | Hexadecane RA (°) |
|---|---|---|---|---|---|
| 0.05 | 2.0 ± 2.0 | 160.5 ± 0.5 | 5.0 ± 0.5 | 126.3 ± 1.0 | N/A |
| 0.1 | 3.0 ± 1.5 | 165.5 ± 0.5 | 1.5 ± 0.5 | 153.2 ± 0.5 | 4.5 ± 0.5 |
| 0.125 | 3.5 ± 1.0 | 165.5 ± 0.5 | 1.5 ± 0.5 | 155.4 ± 0.5 | 3.5 ± 0.5 |
| 0.25 | 5.0 ± 1.0 | 165.5 ± 0.5 | 1.5 ± 0.5 | 156.4 ± 0.5 | 3.5 ± 0.5 |
| 0.5 | 8.0 ± 1.0 | 165.5 ± 0.5 | 1.5 ± 0.5 | 156.4 ± 0.5 | 3.5 ± 0.5 |

Transparency of Coated Surface

Figure 5:
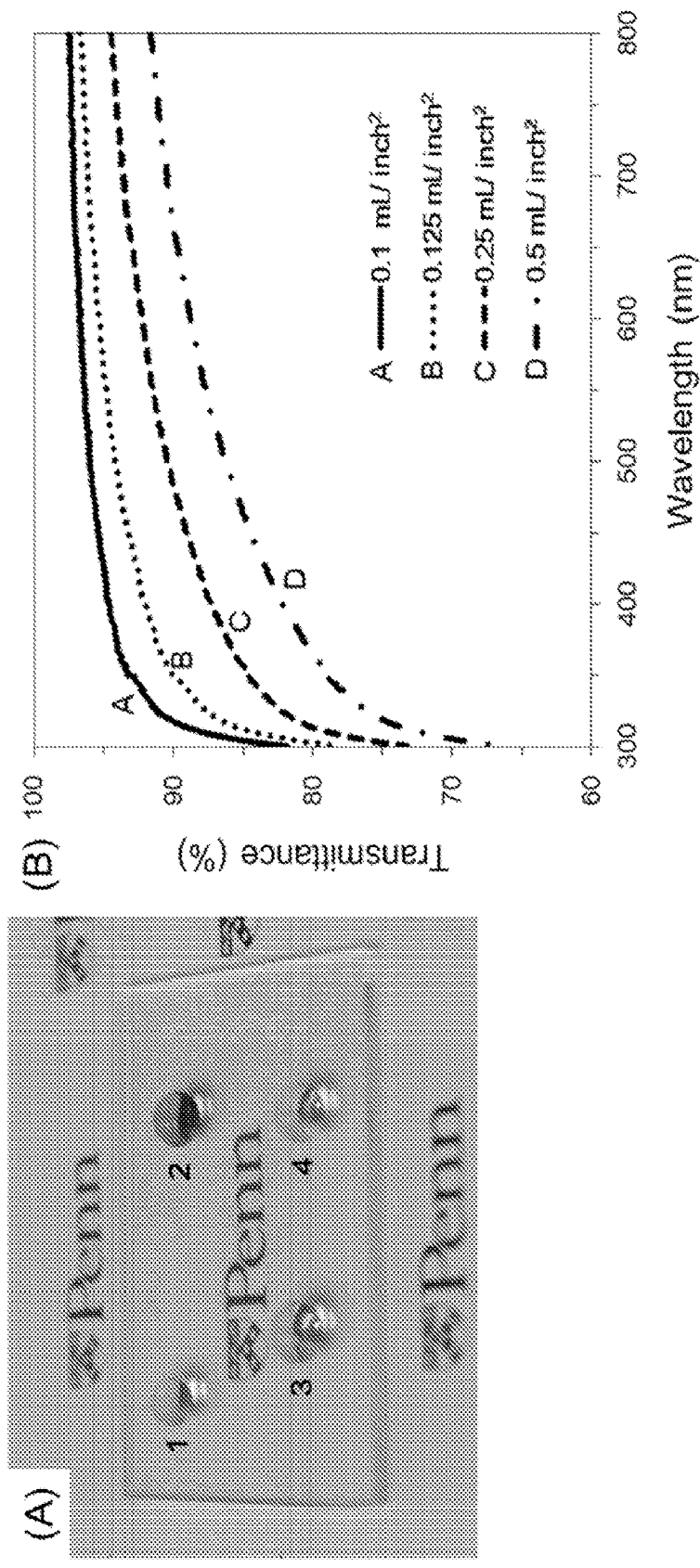
FIG. 5, comprising

The coating was highly transparent as shown in FIG. 5A. The transmittance of visible wavelength was shown to be ~92% from the 0.1 mL/inch² solution (coating thickness, ~3 μm). The high transparency is attributed to the small size of silica NPs and formation of nanopores (20-100 nm, see FIG. 1D).

Mechanism of Superamphiphobic Structure

To achieve superamphiphobicity, it is important to have proper composition of the spray solution materials, i.e. the composition of both stringed silica NPs and TEOS/HDFTES.

Figure 6:
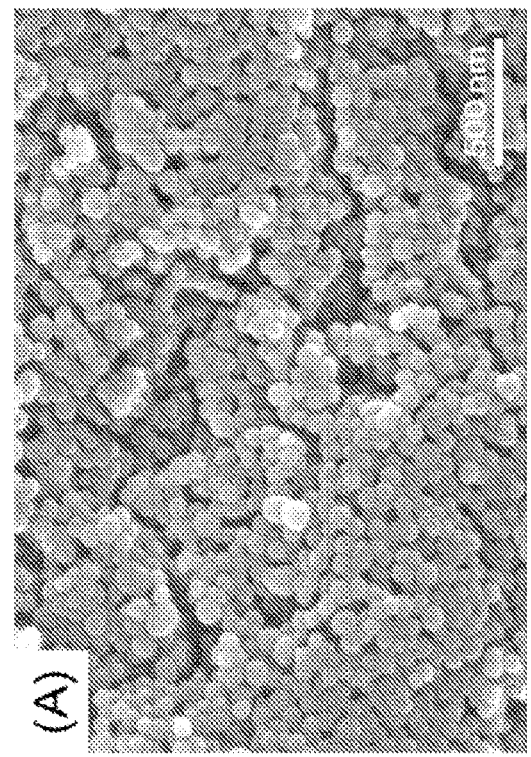
FIG. 6, comprising
Figure 6:

To understand the role of stringed silica NPs, different silica NPs/sol solution for spray were prepared. First, the sol solution was prepared from ethanol (80 mL), ammonia (4 mL), DI-water (8 mL), TEOS (0.3 mL) and HDFTES (0.15 mL) (ES-1 in Table 2). After reaction for 48 h, 0.5 mL sol solution was sprayed on the glass slide (1 inch×1 inch), followed by air drying. This sprayed coating was superhydrophobic but low SCA to hexadecane)(57.6±1°. SEM image (FIG. 6) showed compact assembly of spherical silica NPs (70±30 nm in diameter), which was in sharp contrast to the fractal-like nanoporous structure seen in the superamphiphobic coating from the assembly of stringed NPs (FIG. 1D).

Figure 7:
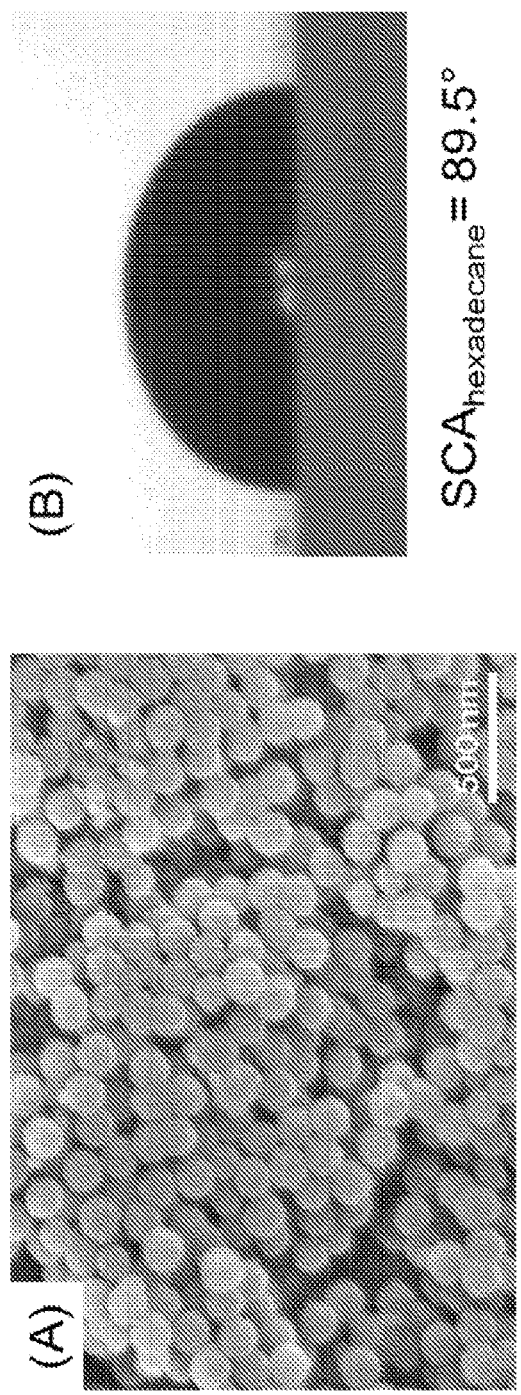
FIG. 7, comprising

For the second sample (ES-2), ethanol (80 mL), ammonia (4 mL), DI-water (8 mL) and 0.5 g spherical silica NPs/IPA (IPA-ST-ZL, 100 nm in diameter, 30 wt % in IPA) was first mixed together with stirring for 10 min. Then TEOS (0.3 mL) and HDFTES (0.15 mL) was added into this mixed solution with stirring for 48 h. 0.5 mL sol solution was sprayed on the glass slide (1 inch×1 inch), followed by air drying. As seen in FIG. 7, the NP assembly was also compact. Again, the prepared surface was superhydrophobic but low SCA to hexadecane (89.5±1°) (See ES-2 in Table 2). Thus, the resulting film was superhydrophobic but not oleophobic for low-surface-tension oil such as hexadecane.

Figure 8:
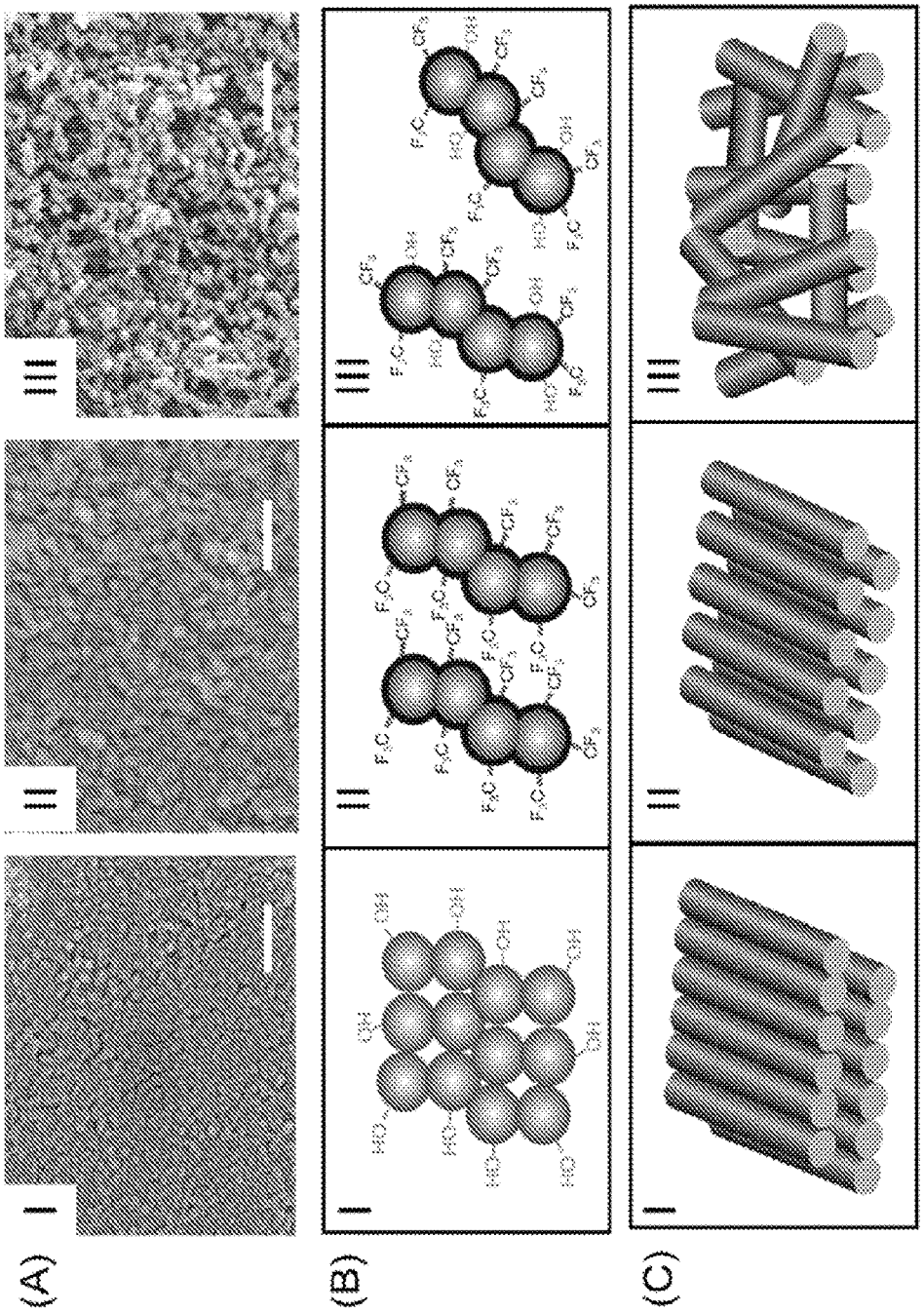
FIG. 8, comprising
Figure 9:
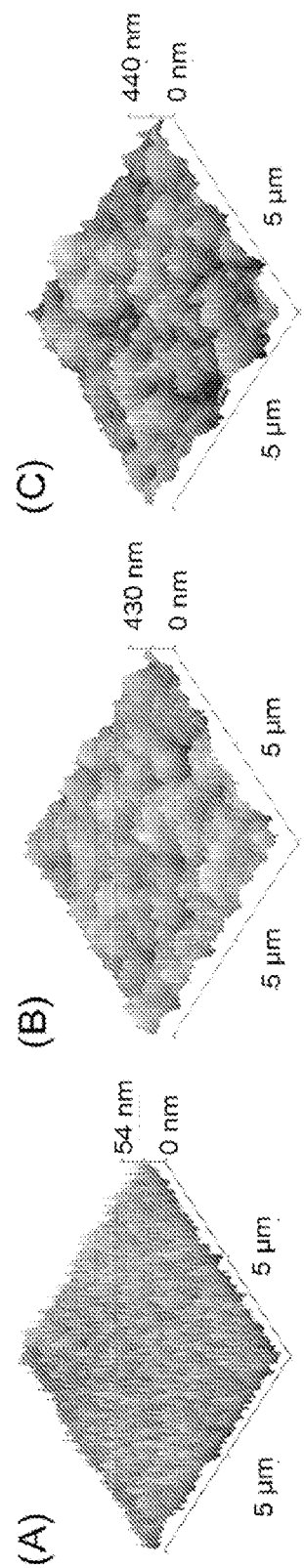
FIG. 9, comprising

For the ES-3 sample, ethanol (80 mL), ammonia (4 mL) and DI-water (8 mL) were mixed by stirring at 800 rpm at room temperature for 10 min. 1 g silica NP/IPA solution (IPA-ST-UP) was then slowly injected into the ethanol-ammonia solution, followed by stirring for 10 min. Then TEOS (0.3 mL) and HDFTES (0.15 mL) were slowly added to the mixture with stirring for 48 h at room temperature. 0.25 mL stringed silica NPs/TEOS/HDFTES sol solution was spray coated on the 1 inch×1 inch glass slide. Only when the stringed NPs were added to the amphiphilic sol solution, the sprayed coating (See ES-3 in Table 2) was superamphiphobic. The SCAs of water, olive oil and hexadecane were 165.5±0.5°, 158.2±0.5° and 156.4±0.5°, respectively. The roll-off angles from different liquids were all smaller than 4°, reflecting that the coating in ES-3 is highly superamphiphobic. It is clear that the formation of fractal-like nanoporous structure in ES-3 is an important factor to achieve superamphiphobicity.

roughness ($R_a$) of 38.7 nm and root-mean-square (rms) roughness of 49.6 nm (FIG. 8AII and FIG. 9B). Through the hydrolysis and condensation of HDFTES, silica NPs were hydrophobilized with a long fluorinated chain end —$(CF_2)_7CF_3$, which became aggregated upon spray coating while exposing the $CF_3$ groups to the outer surface to minimize the surface energy (FIG. 8BII). The increased surface roughness together with the existence of $CF_3$ groups led to significant increase of water repellency (SCA of 152.5±0.5° and RA of 4.5±0.5° for water). However, probably the lack of fractal structure and nanoporosity kept the coating from reaching amphiphobicity (hexadecane SCA of 109.5±0.5°). When both TEOS and HDFTES were mixed in a 2:1 v/v ratio with the stringed silica NPs, the spray-coated coating became rather porous with $R_a$ and rms increased to 47.6 nm and 59.6 nm, respectively (FIG. 8AIII and FIG. 9C), and exhibited superamphiphobicity (SCAs of 165.5°, 156.4° and RAs of 1.5°, 3.5° for water and hexadecane, respectively). Here, it is hypothesized that the NPs surface was covered with both hydroxyl groups (hydrophilic) and fluorocarbon chains (lipophilic), which repelled each other. With the evaporation of solvents during the spray coating, as illustrated in FIG. 8BIII, the anisotropic stringed silica need to rearrange themselves spatially due to the long-range interparticle repulsion introduced by the heterogeneous surface chemistry. With the further evaporation of solvents, the stringed silica NPs with random title angles got closer to each other, just like the self-assembly of tilted rods in FIG. 8CIII, leading to a non-close-packed, fractal-like, loose nanoporous network. Rod particles, nanowires, and carbon nanotubes have much lower percolation threshold than the isotropic ones, forming a network with higher porosity and improved mechanical strength. Meanwhile, some condensation of hydroxyl groups between particles or between particle and substrates occurred (FIG. 1A), which provide the chemical bindings.

Figure 10:
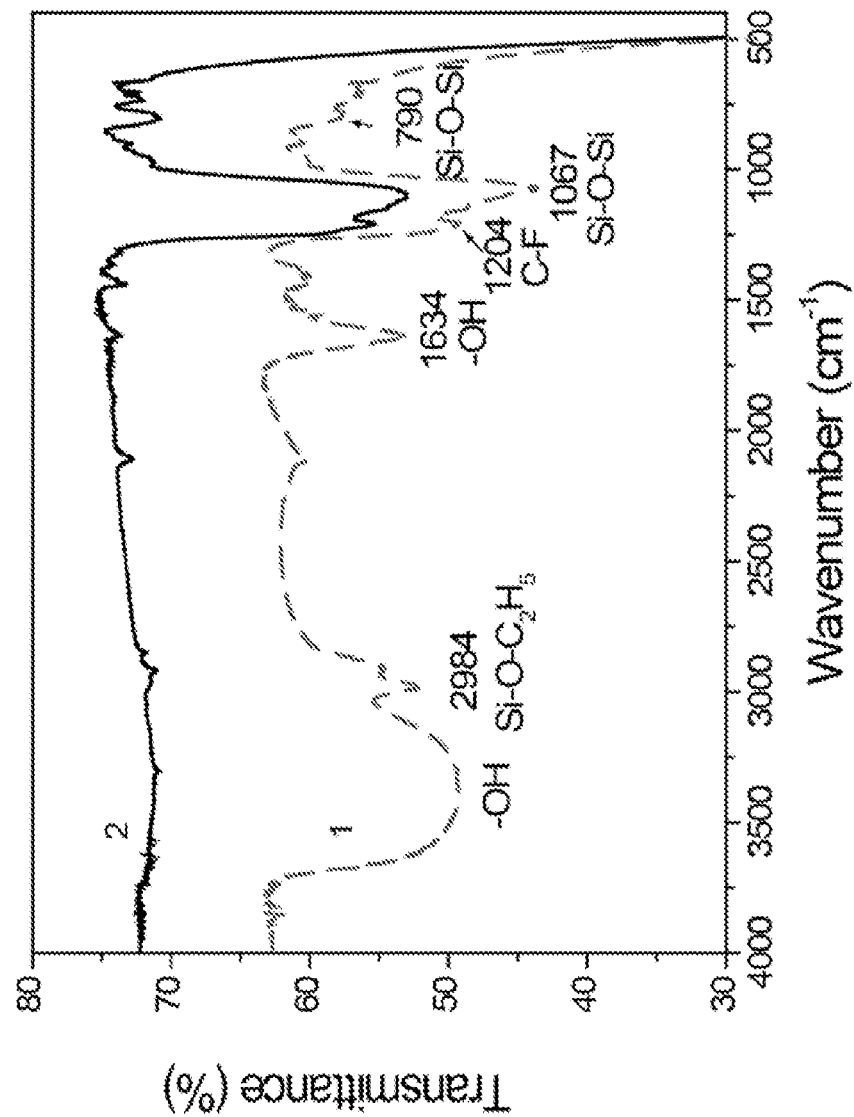
FIG. 10 represents a FT-IR spectra of an exemplary NP/sol solution (blue line (1)) and the sprayed film (black line (2)) consisting of strings of silica NPs and TEOS/HDFTES (2:1 v/v).

To confirm our hypothesis, the chemical structures of the NP/sol solution and the sprayed coating were characterized using FT-IR. As seen in FIG. 10, the characteristic C—F

TABLE 2

Static contact angles (SCAs) and roll-off angles (RAs) of water, olive oil and hexadecane on the sprayed films prepared from different types of silica NPs.

| Sample No. | Type of silica NPs | Water SCA (°) | Water RA (°) | Olive oil SCA (°) | Olive oil RA (°) | Hexadecane SCA (°) | Hexadecane RA (°) |
|---|---|---|---|---|---|---|---|
| ES-1 | — | 159.5 ± 0.5 | 1.5 ± 0.5 | 109.8 ± 1 | N/A | 57.6 ± 1 | N/A |
| ES-2 | 100 nm spherical NPs | 152.4 ± 0.5 | 3.5 ± 0.5 | 109.2 ± 1 | N/A | 89.5 ± 1 | N/A |
| ES-3 | Stringed NPs | 165.5 ± 0.5 | 1.5 ± 0.5 | 158.2 ± 0.5 | 3.5 ± 0.5 | 156.4 ± 0.5 | 4.0 ± 0.5 |

After confirming the importance of stringed NPs, the role of TEOS or HDFTES in the building of superamphiphobic structure was studied. When neither TEOS nor HDFTES were mixed, the sprayed NP coating was nearly close-packed (FIG. 8AI). The pristine stringed silica NPs had surfaces enriched with —OH (FIG. 8BI) and the capillary force induced convective assembly of the stringed silica NPs during solvent evaporation process, which was much like the close-pack of rods (FIG. 8CI). As a result, the coating with smooth surfaces was hydrophilic like the original glass slid (FIG. 9A). If only HDFTES was used to modify the stringed silica NPs, the sprayed coating still appeared rather compact with surface roughness increased to an average stretching peak was observed at 1204 and 1190 cm$^{-1}$ for the NP/sol solution and the sprayed coating, respectively. Peaks at 1087 and 810 cm$^{-1}$ were attributed to the asymmetric and symmetric vibration of Si—O—Si respectively. The peak at 3440 cm$^{-1}$ (—OH groups) in the NP/sol solution nearly disappeared after spray coating, confirming condensation reactions of the sol and sol with NPs, leaving only long chain fluorinated groups on the NP coating surface, which was important to achieve superamphiphobicity.

Thermal Stability

Figure 11:
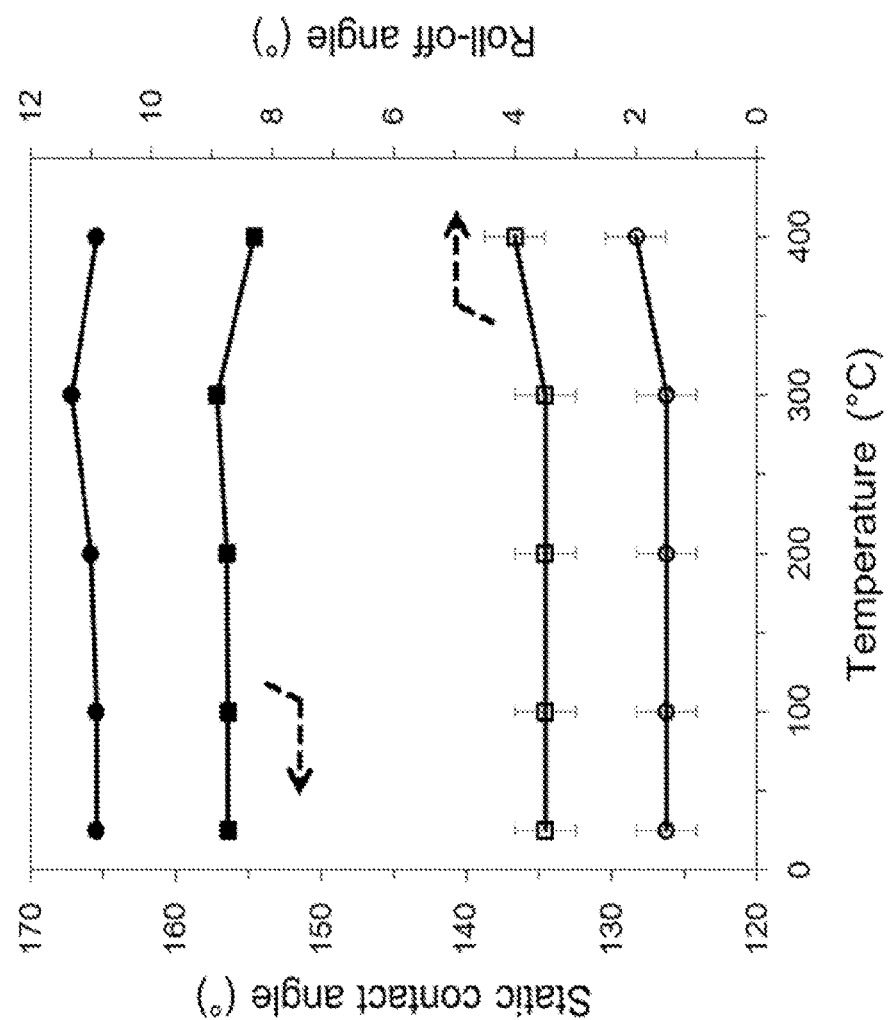
FIG. 11 represents the static contact angles and roll-off angles of water (circles) and hexadecane (squares) on exemplary superamphiphobic coatings heat-treated at different temperatures. The sprayed coating used here had the thickness of 5 μm and was sprayed from 0.25 mL/inch$^2$ solution on glass slide.

One of the major goals is to develop a coating that is thermally and mechanically robust against normal wear and tear and an outdoor environment. As seen in FIG. 11, the static contact angles and roll-off angles of water (solid circle) and hexadecane (solid square) are nearly the same on samples annealed at different temperatures (up to 400° C. in air for 2 h).

Water and Sand Impact Tests

Figure 12:
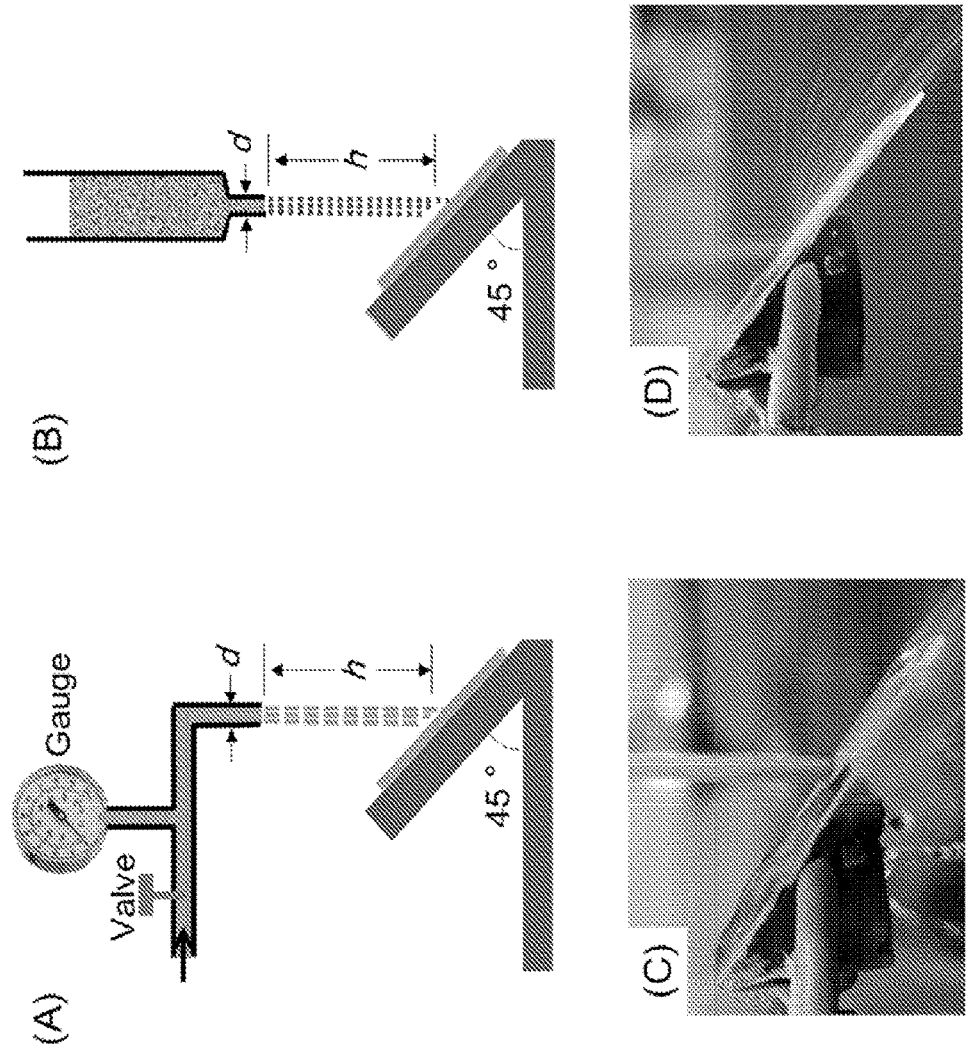
FIG. 12, comprising
Figure 13:
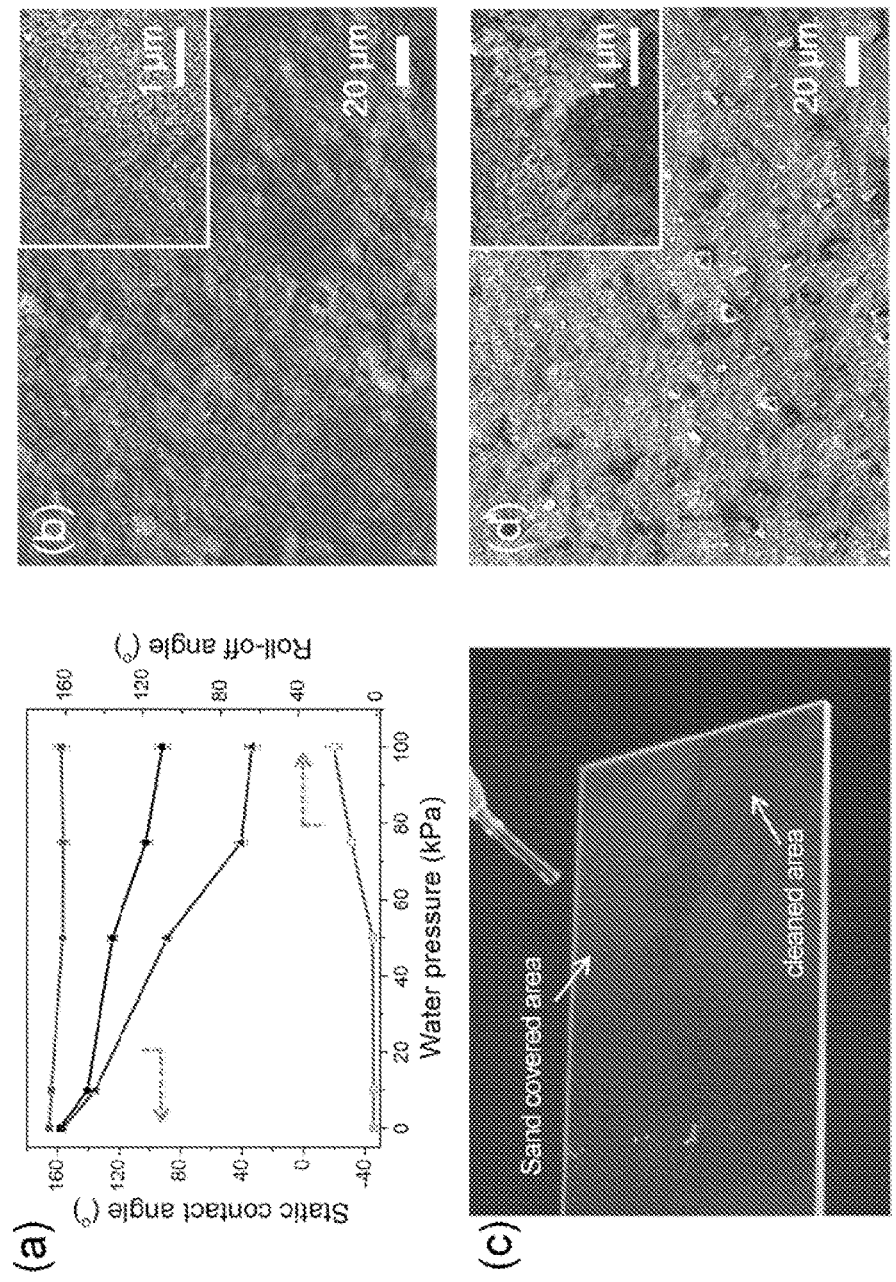
FIG. 13, comprising

Water jetting and sand abrasion tests were performed on the coatings (see set-ups in FIG. 12). In a typical water jetting test, the sample placed at 45° to the horizontal surface was impacted by the water flow from 10 cm above the sample (FIG. 12A). The pressure of the water jet was controlled by the gauge and the water jetting lasted 10 min. The coating exhibited superhydrophobicity (SCA=157.5° and RA=1.5°) after water jetting up to 50 kPa (water velocity of 10 m/s) for 10 min (FIG. 13A). However, at 100 kPa for 10 min (water velocity of 14.1 m/s), the roll-off angle increased to 22°. The oil repellency for hexadecane was lost after water jetting at 50 kPa for 10 min (SCA=88.5°) and for olive oil, SCA=91.7° when water jetting at 100 kPa for 10 min. As seen from SEM image (FIG. 13B), the fractal-like network structure was partially damaged by the water jetting at 50 kPa for 10 min, reducing the coating thickness. Nevertheless, surface remained superhydrophobic, possibly due to the self-similar morphology of the remaining coating, which also consisted of nano-roughness and fluorinated groups. However, the coating lost superoleophobicity due to the damage of fractal-like structures under extensive impact force (see FIG. 13B and inset).

Figure 14:
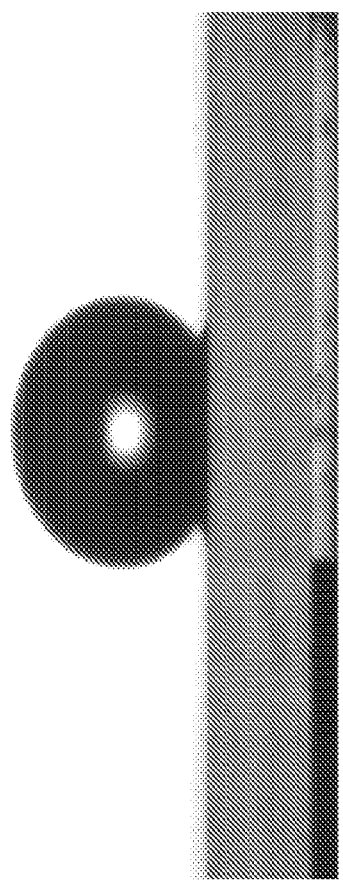
FIG. 14 represents a droplet of hexadecane on an exemplary coating (5 μm-thickness) after sand abrasion (height of 40 cm, 20 g sand) with a static contact angle of 141.7°.
Figure 15:
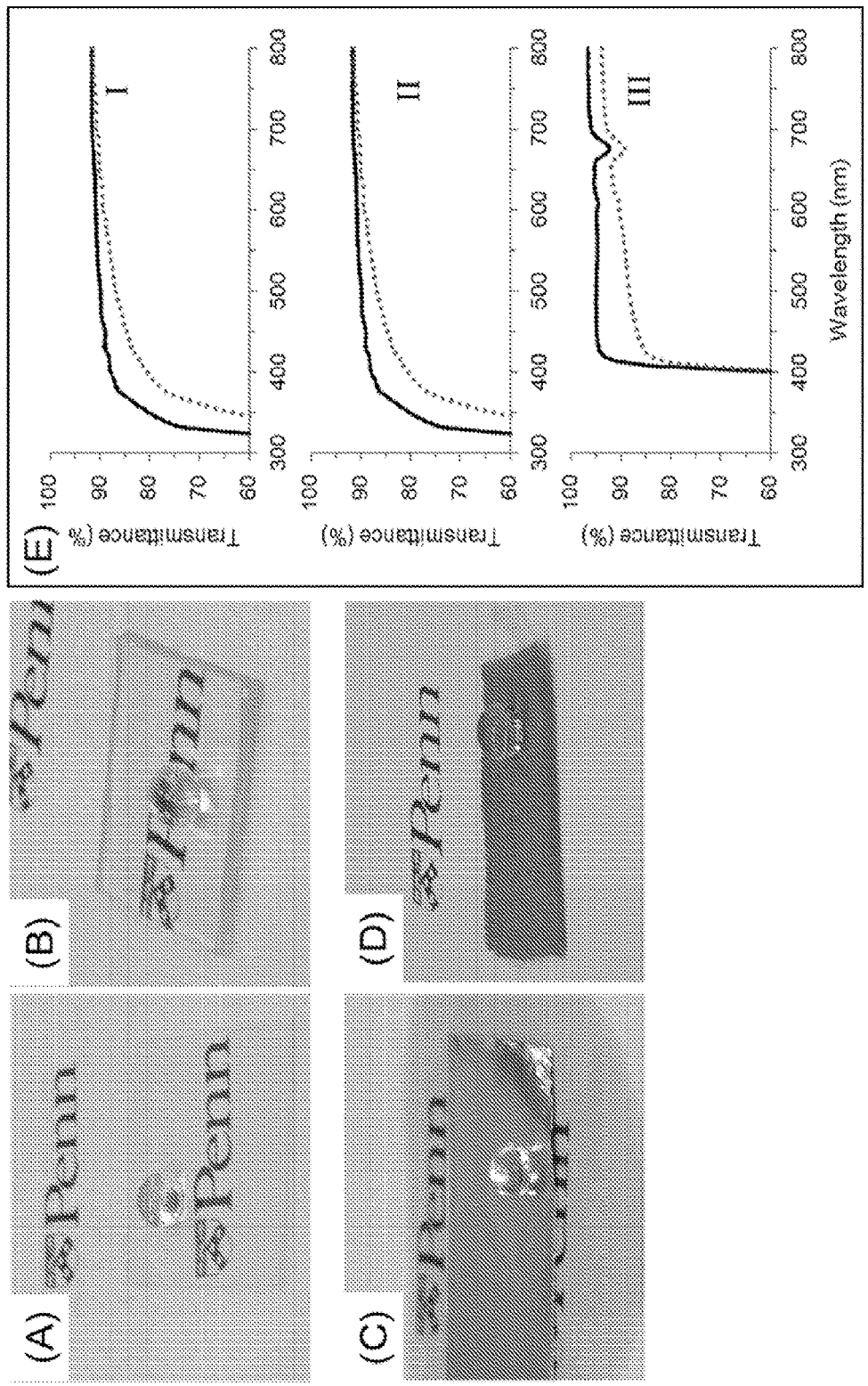
FIG. 15, comprising

For sand abrasion tests, the apparatus was built as shown in FIGS. 12B and 12D and as described in X. Deng, L. Mammen, H. J. Butt, D. Vollmer, Candle Soot as a Template for a Transparent Robust Superamphiphobic Coating. Science 335, 67 (Jan. 6, 2012). 10-30 g commercial sands (10-300 μm in diameter) impacted the coated surface from a height of 40 cm (with the highest impinging energy of $15 \times 10^{-8}$ J per grain), while the substrate was held at 45° to the horizontal surface. The tolerance to sand abrasion is related with the thickness of our coatings. For the coating with the thickness of 5 μm, after sand abrasion of 15 g from 40 cm height, the superamphiphobicity could be kept (hexadecane SCA and RA of 154.8° and 4.0°). When the sand increased to 20 g, it lost the superoleophobicity (hexadecane SCA of 141.7° shown in FIG. 14). A coating with thickness of 8 μm and visible transmittance over 80% were prepared from spray coating of 0.5 mL/inch solution on glass slide. The amphiphobicity and self-cleaning property could be maintained (FIG. 13C) when dropping sands up to 20 g from 40 cm height, although micron-sized holes (diameter of 4-10 μm) were found in the abraded area (FIG. 13D). Interestingly, SCA and RA of hexadecane on the coating after sand abrasion, 153° and 4.5° were almost invariant with respect to the original coating. Thus, the coating did not show hints of altering wet-repellency after 20 g sand impacting from 40 cm height (hexadecane SCA and RA of 153.6° and 4.5°). But 30 g sand impacting from 40 cm height will destroy the superamphiphobicity of the coating of 8 μm (hexadecane SCA of 140.2°).

Here, it is believed that the chemical bonding between stringed silica NPs and substrates or neighboring NPs as well as the 3D network should contribute to the excellent robustness. Further increase in the amount of sand led to increased density and depth of micron-sized holes. Eventually, the whole coating lost its oleophobicity and hydrophobicity when 30 g of sand was dropped because of the percolated holes and the exposure of the bare glass substrate.

Calculation of Impinging Energy of Single Sand Grain

The impinging energy of one sand grain (10-300 μm) on the superamphiphobic coating from 40 cm height could be calculated by:

$$E = \tfrac{1}{2}mv^2 = mgh$$

$$m = \tfrac{4}{3}\pi r^3 \rho$$

So: $E = \tfrac{4}{3}\pi r^3 \rho gh = \tfrac{1}{6}\pi D^3 \rho gh$

Here: m is the weight of one sand grain (kg), v is the velocity of sand when impacting the coating (m/s), D is the diameter of one sand grain (m), ρ is the density of sand grain (2650 kg/m$^3$), g is the acceleration of gravity (9.8 m/s$^2$), h is height of the sand from the film (here h=0.4 m).

For the sand grain with the diameter of 10 μm, $E = 5.6 \times 10^{-12}$ J;

For the sand grain with the diameter of 300 μm, $E = 15 \times 10^{-8}$ J.

Calculation of Water Velocity

For high-pressure water, the jetting speed was calculated as follows:

$$v = (v_0^2 + 2gh)^{1/2} \quad v_0 = j(2(P_1 - P_2)/\rho))^{1/2}$$

Here v is the velocity of water on the sample surface (m/s), $v_0$ is the velocity of water near pipe (m/s), h is the height of falling water (m), j is velocity coefficient (dependent on the shape of pipe and valve), ($P_1 - P_2$) is pressure difference (Pa), ρ is fluid density (kg/m$^3$).

Because the water velocity caused by pressure is much higher than which caused by gravity, so here $v = v_0$. Considering the ideal state, $j=1$ and $P_2=0$ for open system. The velocity of water could be simplified as followed equation and here $P_1$ is measured water pressure.

$$v = v_0 = \left(\frac{2P_1}{\rho}\right)^{1/2} \quad v = v_0 = (2(P_1/\rho))^{1/2}$$

When $P_1$=10 kPa, 50 kPa, 75 kPa, and 100 kPa, the water velocity was 4.46 m/s, 10 m/s, 12.2 m/s and 14.1 m/s, respectively.

Superamphiphobic Coatings on Different Substrates

Figure 16:
FIG. 16, illustrates flexibility tests performed on a PET film coated with exemplary superamphiphobic coatings. After the film was bent outward and inward repeatedly, ~1200 cycles, a drop of olive oil was dropped on the film. The oil droplet rolled back and forth freely on the bent PET film, demonstrating that superamphiphobicity of the coating was not affected by the bending cycles.

The versatility of the spray coating solution was tested on a wide range of substrates, including polystyrene (PS), polycarbonate (PC), polyethylene terephthalate (PET), aluminum foil, copper foil and cotton fabric. These substrates were sprayed coated with 0.25 mL solution over an area of 1 inch×1 inch in 2 min. The wettability of hexadecane on these substrates was summarized in Table 3. All coated substrates exhibited excellent superamphiphobicity with high transparency (see FIG. 14 and Table 3). For example, all the coated surfaces showed high hexadecane contact angle (153°-162°) and low roll-off angle (<5°). The transmittance decreased by no more than 10% in the visible region. This indicated that the formation of superamphiphobic structure was not affected by the nature of the substrate. Further, the coating could be sprayed onto a curved surface, the inside walls of PS beaker, which also exhibited superoleophobicity. Because PET is flexible, the durability of the coating was tested by bending the coated PET back and forth. After ~1200 time bending cycles at a speed of 2 times/s, the coated PET film remained superamphiphobic, which could be attributed to the excellent conformability of the thin coating and formation of the 3D network structure (FIG. 16).

TABLE 3

Wettability of hexadecane on different substrates spray coated with our superamphiphobic coatings.

| Substrates | Surface tension (mN/m@20° C.) | Hexadecane SCA (°) | RA (°) |
|---|---|---|---|
| Glass | 71 | 156.4 ± 0.5 | 4.5 ± 0.5 |
| Aluminum foil | 45 | 161.6 ± 0.5 | 3.5 ± 0.5 |
| Copper foil | 44 | 158.2 ± 0.5 | 4.5 ± 0.5 |
| PC | 46 | 154.9 ± 0.5 | 3.5 ± 0.5 |
| PET | 41 | 158.4 ± 0.5 | 2.0 ± 0.5 |
| PS | 37 | 153.8 ± 0.5 | 4.5 ± 0.5 |
| Cotton fabric | N/A | 157.5 ± 0.5 | 3.5 ± 0.5 |

As shown herein, a highly robust, transparent and superamphiphobic surface has been successfully fabricated by spray coating of stringed perfluorinated silica particles dispersed in an amphiphilic sol solution on a wide range of planar and curved substrates, including glass, plastic, metals or cotton fabrics. The one-step synthesized coating showed excellent water and oil-repellency (SCA and RA of 156.4° and 3.5° for hexadecane), high transmittance (over 90%) in the visible region and good mechanical stability against water jetting and sand abrasion. These studies show that the combination of amphiphilic sol solution and the stringed NPs was important to the formation of fractal-like nanoporous NP coating, which in turn exhibited robust superamphiphobicity with high transparency. The TEOS/HDFTES sol acted as both surface modifier of the NPs and chemical binders between the substrate and NPs, and between NPs. The repulsion between the stringed NPs in the sol solution and its low percolation threshold led to the formation of a loosely assembled NP network. The study presented here will offer new insights to design NP coatings for scalable manufacturing of robust, transparent and superamphiphobic surfaces for a wide range of applications, including automotive and building windows, display panels of hand-held electronics, and optical devices. Importantly, the superamphiphobic coatings could be applied to a variety of flat and curved substrates simply by spray coating on general industrial solid surfaces such as glasses, plastics, metals and fabrics, over a large area without any pre- or post-treatment.

EMBODIMENTS

The following list of embodiments is intended to complement, rather than displace or supersede, the previous descriptions.

Embodiment 1. A fluid composition comprising: at least one silane having one or more hydrophilic groups; at least one silane having one or more fluorinated moieties; and stringed silica nanoparticles.

Embodiment 2. The composition of Embodiment 1, wherein the stringed silica nanoparticles are dispersed in a sol solution of a partial condensation product of the at least one silane having one or more hydrophilic groups and the at least one silane having one or more fluorinated moieties.

Embodiment 3. The composition of Embodiments 1 or 2, wherein the hydrophilic groups are alkoxy groups, epoxy groups, or amino groups.

Embodiment 4. The composition of Embodiment 3, wherein the alkoxy groups are lower alkoxy groups.

Embodiment 5. The composition of any of the previous Embodiments, wherein the fluorinated moiety is a fluorinated $C_4$-$C_{16}$ moiety.

Embodiment 6. The composition of any one of Embodiments 1 to 5, wherein the at least one silane having hydrophilic groups is tetraethyl orthosilicate (TEOS) and the at least one silane having fluorinated moieties comprises (heptadecafluoro-1, 1, 2, 2 tetrahydrodecyl)triethoxysilane (HDFTES).

Embodiment 7. The composition of any one of Embodiments 1 to 6, wherein the sol solution is prepared by mixing at least one silane having one or more alkoxy groups and at least one silane having one or more perfluorinated moieties with a sub-stoichiometric amount of water.

Embodiment 8. The composition of any one of Embodiments 1 to 7, further comprising a solvent, a catalyst, or both.

Embodiment 9. The composition of Embodiment 8 comprising a lower alcohol, ammonia, water, or any combination thereof.

Embodiment 10. The composition of any one of Embodiments 1 to 9, wherein said composition has a silica nanoparticle concentration in a range of from about 0.02 wt % to about 10 wt %.

Embodiment 11. The composition of any one of the previous Embodiments, wherein the fluorinated moiety is a perfluorinated moiety.

Embodiment 12. A superamphiphobic surface resulting from coating and curing a composition of any one of Embodiments 1 to 11 on a substrate.

Embodiment 13. The surface of Embodiment 12, wherein the surface has a static water contact angle greater than 150°, a hexadecane contact angle greater than 150°, and a liquid roll-off angle of less than 5°.

Embodiment 14. The surface of Embodiments 12 or 13, wherein the substrate comprises glass, ceramic, plastic, metal, fabric, paper, concrete, stone, brick, wood, or a combination thereof.

Embodiment 15. The surface of any one of Embodiments 12 to 14, wherein the fluid composition is present as a fractal-like nanoporous structure on the surface.

Embodiment 16. The surface of any one of Embodiments 12 to 15, wherein the surface is transparent to visible light.

Embodiment 17. The surface of any one of Embodiments 12 to 16, wherein the surface is resistant to mechanical wears.

Embodiment 18. The surface of Embodiment 17, wherein the surface is resistant to impact with liquids.

Embodiment 19. The surface of Embodiment 17, wherein the surface is resistant to impact with solids.

Embodiment 20. A method of forming a superamphiphobic surface, comprising: coating a substrate with the fluid composition of any one of Embodiments 1 to 11; and curing the coated substrate.

Embodiment 21. The method of Embodiment 20, wherein said curing comprises air drying.

Embodiment 22. The method of Embodiment 20, wherein said curing comprises exposing the surface to ultraviolet radiation.

Embodiment 23. The method of Embodiment 20, wherein coating comprises spray coating.

Embodiment 24. The method of any one of Embodiments 20 to 23, wherein the substrate comprises glass, ceramic, plastic, metal, fabric, paper, concrete, stone, brick, wood, or a combination thereof.

What is claimed:

1. A fluid composition comprising:
    at least one silane having one or more hydrophilic groups;
    at least one silane having one or more fluorinated moieties; and
    stringed silica nanoparticles.

2. The fluid composition of claim 1, wherein the stringed silica nanoparticles are dispersed in a sol solution of a partial condensation product of the at least one silane having one or more hydrophilic groups and the at least one silane having one or more fluorinated moieties.

3. The fluid composition of claim 1, wherein the one or more hydrophilic groups are alkoxy groups, epoxy groups, or amino groups.

4. The fluid composition of claim 3, wherein the alkoxy groups are lower alkoxy groups.

5. The fluid composition of claim 1, wherein the one or more fluorinated moieties is a fluorinated $C_4$-$C_{16}$ moiety.

6. The fluid composition of claim 1, wherein the at least one silane having one or more hydrophilic groups comprises tetraethyl orthosilicate (TEOS) and the at least one silane having one or more fluorinated moieties comprises (heptadecafluoro-1, 1, 2, 2 tetrahydrodecyl)triethoxysilane (HD-FTES).

7. The fluid composition of claim 2, wherein the sol solution is prepared by mixing at least one silane having one or more alkoxy groups and at least one silane having one or more perfluorinated moieties with a sub-stoichiometric amount of water.

8. The fluid composition of claim 1, further comprising a solvent, a catalyst, or both.

9. The fluid composition of claim 8, further comprising a lower alcohol, ammonia, water, or any combination thereof.

10. The fluid composition of claim 1, wherein said composition has a silica nanoparticle concentration in a range of from about 0.02 wt % to about 10 wt %.

11. The fluid composition of claim 1, wherein the one or more fluorinated moieties is a perfluorinated moiety.

12. A superamphiphobic surface resulting from coating and curing a fluid composition of claim 1 on a substrate.

13. The superamphiphobic surface of claim 12, wherein the surface has a static water contact angle greater than 150°, a hexadecane contact angle greater than 150°, and a liquid roll-off angle of less than 5°.

14. The superamphiphobic surface of claim 12, wherein the substrate comprises glass, ceramic, plastic, metal, fabric, paper, concrete, stone, brick, wood, or a combination thereof.

15. The superamphiphobic surface of claim 12, wherein the fluid composition is present as a fractal-like nanoporous structure on the surface.

16. The superamphiphobic surface of claim 12, wherein the surface is transparent to visible light, is resistant to mechanical wears, or both.

17. The superamphiphobic surface of claim 16, wherein the surface is resistant to impact with liquids, solids, or both.

18. A method of forming a superamphiphobic surface, comprising:
coating a substrate with the fluid composition of claim 1; and
curing the coated substrate.

19. The method of claim 18, wherein said curing comprises air drying.

20. The method of claim 18, wherein said curing comprises exposing the surface to ultraviolet radiation.

21. The method of claim 18, wherein coating comprises spray coating.

22. The method of claim 18, wherein the substrate comprises glass, ceramic, plastic, metal, fabric, paper, concrete, stone, brick, wood, or a combination thereof.

* * * * *